United States Patent [19]

Tarhan et al.

[11] 4,124,685

[45] Nov. 7, 1978

[54] METHOD FOR SUBSTANTIALLY COMPLETE REMOVAL OF HYDROGEN SULFIDE FROM SULFUR BEARING INDUSTRIAL GASES

[76] Inventors: Mehmet O. Tarhan, 722 Beverly Ave., Bethlehem, Pa. 18018; Daniel Kwasnoski, 103 Beech Cir., Hellertown, Pa. 18055

[21] Appl. No.: 873,464

[22] Filed: Jan. 30, 1978

Related U.S. Application Data

[63] Continuation-in-part of Ser. No. 693,991, Jun. 8, 1976, abandoned.

[51] Int. Cl.$^2$ .............................................. C01B 17/00
[52] U.S. Cl. ................................. 423/574 L; 423/575
[58] Field of Search ............... 423/571, 573, 575, 576, 423/222, 226; 55/68, 73

[56] References Cited

U.S. PATENT DOCUMENTS

| | | | |
|---|---|---|---|
| 1,915,364 | 6/1933 | Harrel | 423/574 |
| 2,413,714 | 1/1947 | Keeling | 423/576 |
| 2,562,158 | 7/1951 | Wilde | 423/574 |
| 2,765,217 | 10/1956 | Conroy et al. | 423/574 |
| 3,764,665 | 10/1973 | Groenendaal | 423/574 |
| 3,773,900 | 11/1973 | Roberts et al. | 423/567 X |
| 3,781,445 | 12/1973 | Moss et al. | 423/574 |
| 3,798,308 | 3/1974 | Tatterson | 423/574 |
| 3,803,288 | 4/1974 | Kudryr | 423/571 |
| 3,832,454 | 8/1974 | Renault et al. | 423/574 |
| 3,839,549 | 10/1974 | Deschamps et al. | 423/575 |
| 3,840,653 | 10/1974 | Diemer et al. | 423/573 |
| 3,848,071 | 11/1974 | Groenendaal | 423/574 |
| 3,864,460 | 2/1975 | Connell | 423/574 R |
| 3,878,289 | 4/1975 | Beavon | 423/236 X |
| 3,989,811 | 11/1976 | Hill | 423/573 X |
| 4,001,386 | 1/1977 | Klein et al. | 423/574 |

FOREIGN PATENT DOCUMENTS

| | | | |
|---|---|---|---|
| 716,264 | 9/1954 | United Kingdom | 423/574 |
| 744,908 | 2/1956 | United Kingdom | 423/574 |

OTHER PUBLICATIONS

Barry, C.B.; "Hydrocarbon Processing", 4-1972 pp. 102-106.

Harima, M.; "Chemical Economy & Engineering Review" vol. 6, No. 8, Aug. 1974; pp. 13-21.

*Primary Examiner*—G. O. Peters
*Attorney, Agent, or Firm*—Joseph J. O'Keefe; Charles A. Wilkinson; Michael Leach

[57] ABSTRACT

Hydrogen sulfide is substantially completely removed from a sulfur bearing industrial gas stream by absorbing the $H_2S$ into a liquid absorbent, stripping the absorbent of absorbed $H_2S$ and reacting it with $SO_2$ in a ratio of $H_2S/SO_2$ greater than the stoichiometric ratio of 2.0:1.0 to produce elemental sulfur and water, leaving a tail gas containing an excess of hydrogen sulfide but no sulfur dioxide. At least the last stage of the reaction is carried out in a liquid reaction medium at a temperature not greater than 160° C. The excess $H_2S$ assures complete reduction at these temperatures of all $SO_2$ to elemental sulfur. The remaining excess $H_2S$ is then recycled in the tail gas back into the original industrial gas stream prior to the point of contact of the industrial gas stream with the liquid absorbing solution.

15 Claims, 15 Drawing Figures

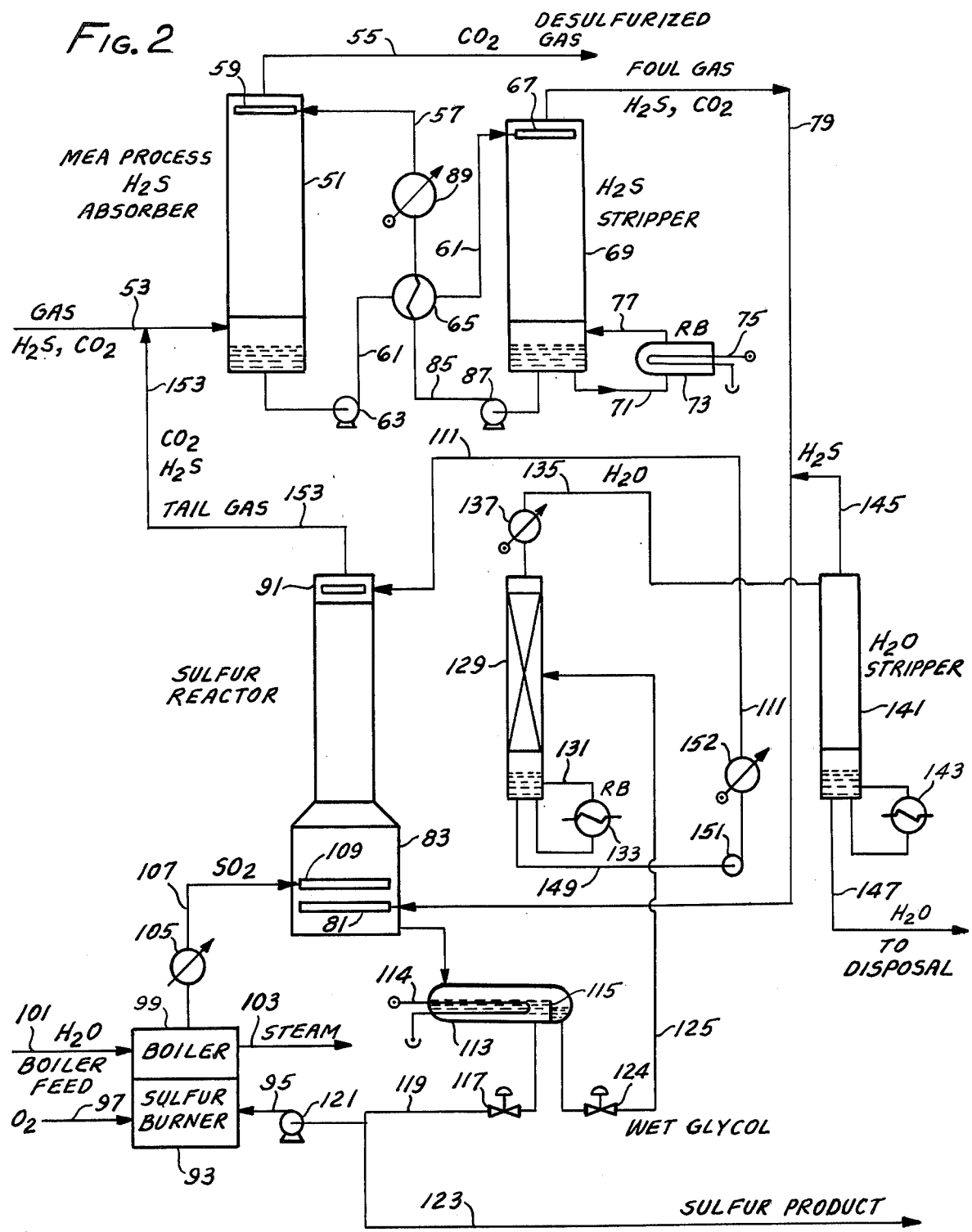

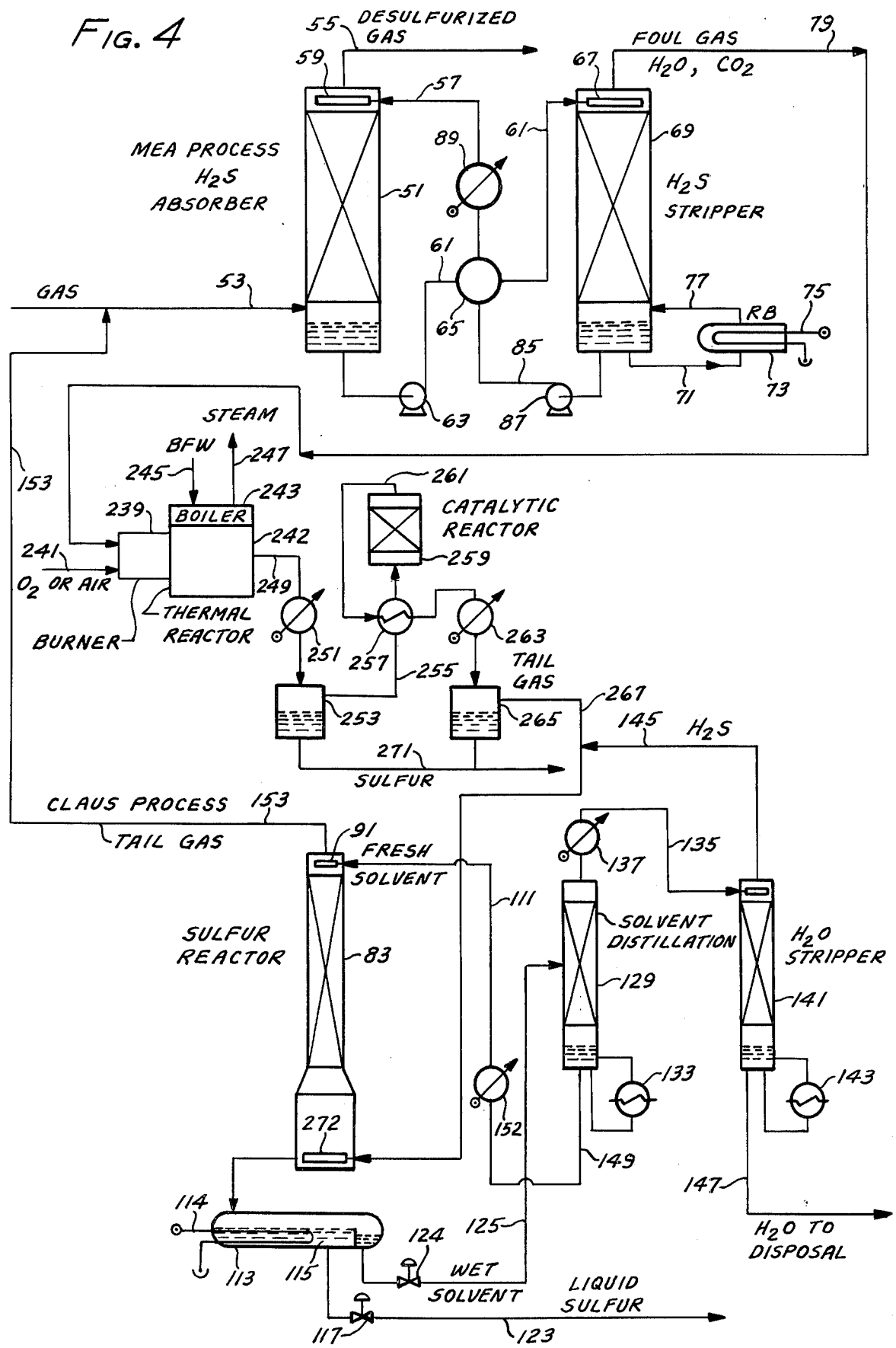

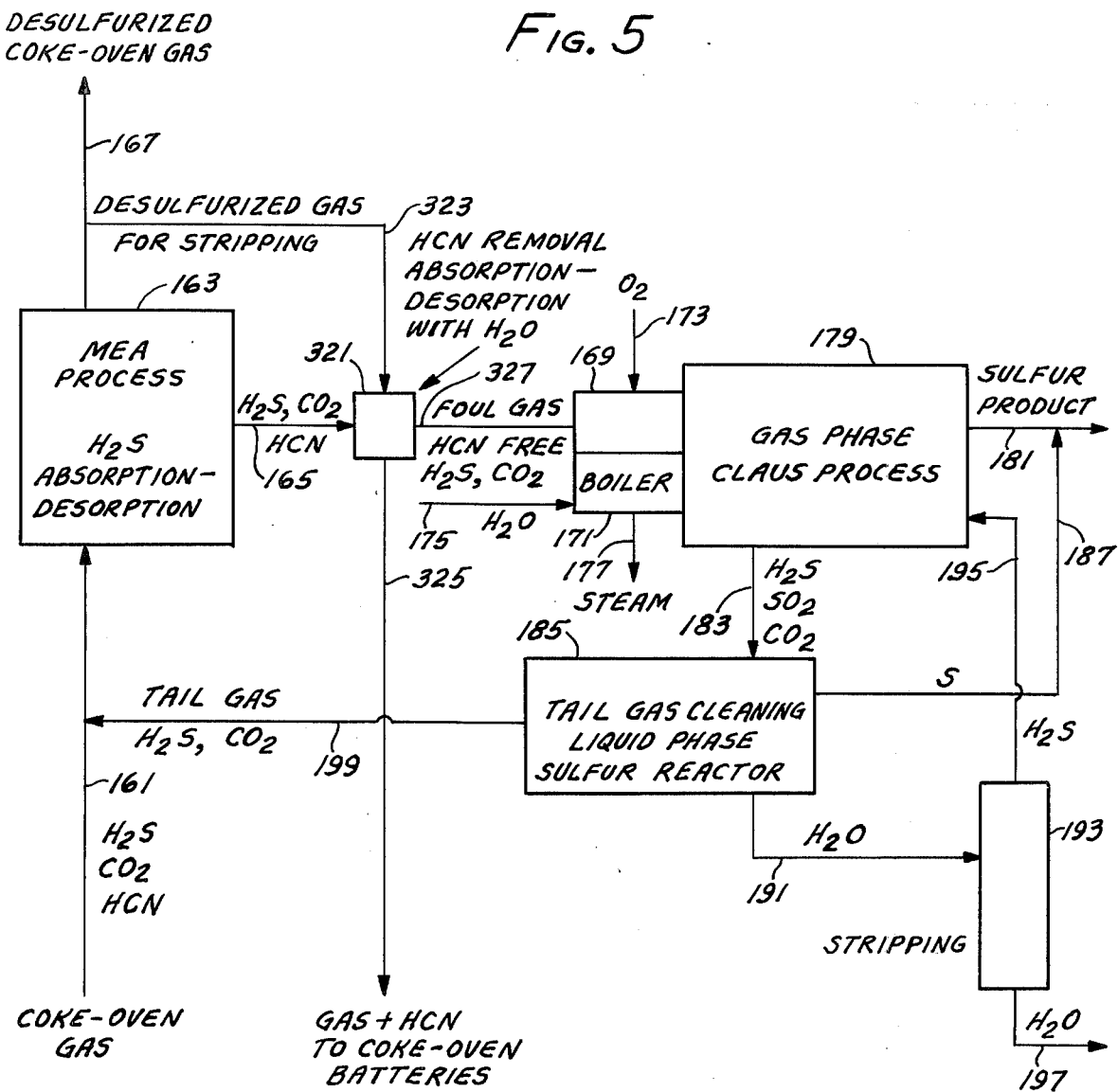

FIG. 6
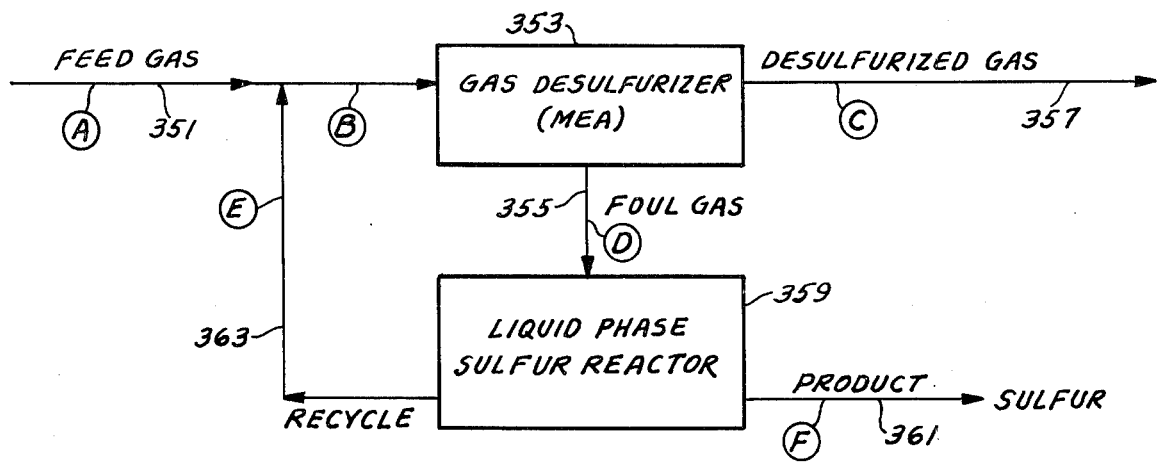
FIG. 6A
TABLE I
| GAS COMPOSITION VOLUME-% \ GAS POINTS | A | B | C | D | E |
|---|---|---|---|---|---|
| $H_2S$ | 0.29 | 0.31 | 0.01 | 28.57 | 1.92 |
| $CO_2$ | 0.30 | 1.05 | 0.30 | 71.43 | 55.28 |
| $C_1-C_4$ | 99.41 | 98.05 | 99.10 | — | — |
| OTHER | 0 | 0.59 | 0.59 | — | 42.80 |
| TOTAL | 100.00 | 100.00 | 100.00 | 100.00 | 100.00 |
FIG. 7
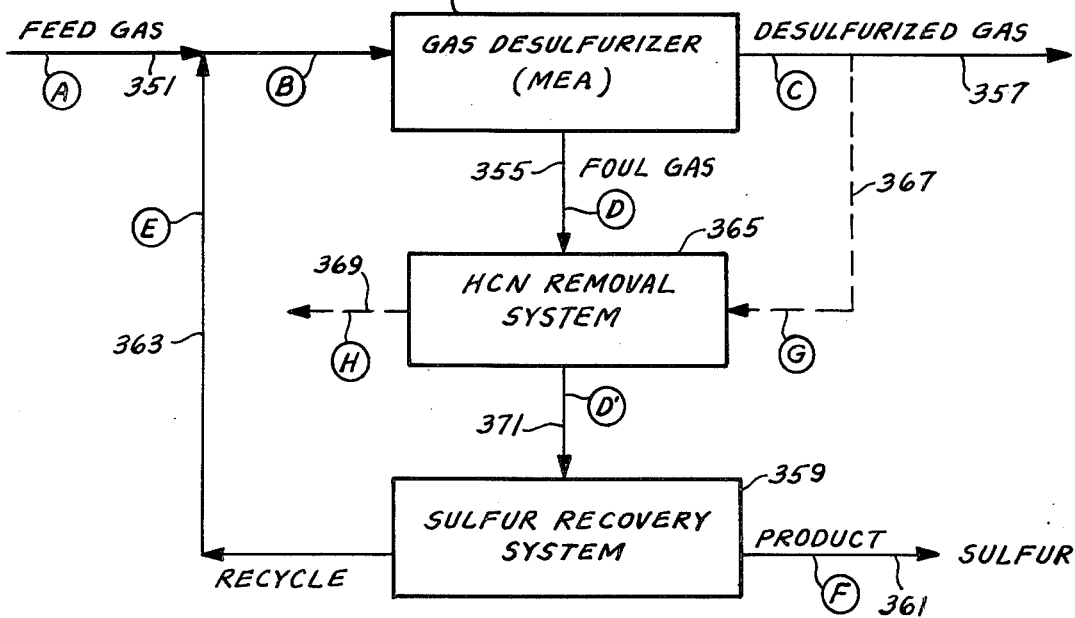

TABLE II

FIG. 6B

| GAS QUANTITIES IN kg-mols/hr | | | | | | |
|---|---|---|---|---|---|---|
| POINTS<br>Kg-mols/hr | A | B | C | D | E | F |
| $H_2S$ | 15.28 | 16.68 | 0.52 | 16.16 | 1.40 | |
| $CO_2$ | 15.80 | 56.20 | 15.80 | 40.40 | 40.40 | |
| $C_1-C_4$ | 5,236.92 | 5,236.92 | 5,236.92 | — | — | |
| OTHER | 0 | 31.28 | 31.28 | — | 31.28 | |
| TOTAL | 5,268.00 | 5,341.08 | 5,284.52 | 56.56 | 73.08 | |
| SULFUR (Kg-atoms/hr) | (FINAL PRODUCT) | | | | | 14.76 |

TABLE III

FIG. 6C

| GAS COMPOSITION | | | | | |
|---|---|---|---|---|---|
| POINTS<br>GAS COMPOSITION VOLUME—% | A | B | C | D | E |
| $H_2S$ | 0.65 | 0.70 | 0.01 | 37.69 | 2.72 |
| $CO_2$ | 2.30 | 3.27 | 2.28 | 56.52 | 40.75 |
| $N_2$ | 4.20 | 5.39 | 5.49 | — | 51.12 |
| $H_2$ | 55.00 | 53.61 | 54.62 | — | — |
| $CH_4$ | 27.60 | 26.90 | 27.41 | — | — |
| CO | 7.40 | 7.21 | 7.35 | — | — |
| HCN | 0.10 | 0.20 | 0.10 | 5.79 | 4.17 |
| OTHER | 2.75 | 2.72 | 2.76 | — | 1.24 |
| TOTAL | 100.00 | 100.00 | 100.00 | 100.00 | 100.00 |

TABLE IV

FIG. 6D

| GAS QUANTITIES IN kg-mols/hr | | | | | | |
|---|---|---|---|---|---|---|
| POINTS<br>Kg-mols/hr | A | B | C | D | E | F |
| $H_2S$ | 34.24 | 37.96 | 0.79 | 37.17 | 3.72 | |
| $CO_2$ | 121.15 | 176.90 | 121.15 | 55.75 | 55.75 | |
| $N_2$ | 221.22 | 291.15 | 291.15 | — | 69.93 | |
| $H_2$ | 2,897.00 | 2,897.00 | 2,897.00 | — | — | |
| $CH_4$ | 1453.77 | 1453.77 | 1453.77 | — | — | |
| CO | 389.78 | 389.78 | 389.78 | — | — | |
| HCN | 5.27 | 10.98 | 5.27 | 5.71 | 5.71 | |
| OTHER | 144.84 | 146.53 | 146.53 | — | 1.69 | |
| TOTAL | 5,267.27 | 5,404.07 | 5,305.44 | 98.63 | 136.80 | |
| SULFUR (Kg-atoms/hr) | (FINAL PRODUCT) | | | | | 33.45 |

TABLE V       FIG. 7A

| GAS COMPOSITION | | | | | | | |
|---|---|---|---|---|---|---|---|
| GAS POINTS / GAS COMPOSITION VOLUME — % | A | B | C G | D | D' | E | H |
| $H_2S$ | 0.65 | 0.70 | 0.015 | 38.16 | 40.00 | 2.84 | 0.01 |
| $CO_2$ | 2.30 | 3.28 | 2.29 | 57.24 | 60.00 | 42.53 | 2.07 |
| $N_2$ | 4.20 | 5.39 | 5.49 | — | — | 53.34 | 4.95 |
| $H_2$ | 55.00 | 53.67 | 54.65 | — | — | — | 49.14 |
| $CH_4$ | 27.60 | 26.93 | 27.43 | — | — | — | 24.66 |
| CO | 7.40 | 7.22 | 7.35 | — | — | — | 6.61 |
| HCN | 0.10 | 0.10 | 0.015 | 4.60 | — | — | 10.09 |
| OTHER | 2.75 | 2.71 | 2.76 | — | — | 1.29 | 2.47 |
| TOTAL | 100.00 | 100.00 | 100.00 | 100.00 | 100.00 | 100.00 | 100.00 |

TABLE VI      FIG. 7B

| GAS QUANTITIES IN Kg—mols/hr | | | | | | | | |
|---|---|---|---|---|---|---|---|---|
| POINTS / Kg—mols/hr | A | B | C | D | D' | E | F | G | H |
| $H_2S$ | 34.24 | 37.96 | 0.79 | 37.17 | 37.17 | 3.72 | — | 0.006 | 0.006 |
| $CO_2$ | 121.15 | 176.90 | 121.15 | 55.75 | 55.75 | 55.75 | — | 0.92 | 0.92 |
| $N_2$ | 221.22 | 291.15 | 291.15 | — | — | 69.93 | — | 2.20 | 2.20 |
| $H_2$ | 2,897.00 | 2,897.00 | 2,897.00 | — | — | — | — | 21.86 | 21.86 |
| $CH_4$ | 1,453.77 | 1,453.77 | 1,453.77 | — | — | — | — | 10.97 | 10.97 |
| CO | 389.78 | 389.78 | 389.78 | — | — | — | — | 2.94 | 2.94 |
| HCN | 5.27 | 5.27 | 0.79 | 4.48 | — | — | — | 0.006 | 4.486 |
| OTHER | 144.84 | 146.53 | 146.53 | — | — | 1.69 | — | 1.10 | 1.10 |
| TOTAL | 5,267.27 | 5,398.36 | 5,300.96 | 97.40 | 92.92 | 131.09 | — | 40.00 | 44.482 |
| SULFUR (Kg-atoms/hr) (FINAL PRODUCT) | | | | | | | | | 33.45 |

TABLE VII — FIG. 7C

| GAS COMPOSITION | | | | | | |
|---|---|---|---|---|---|---|
| GAS COMPOSITION VOLUME—% \ POINTS | A | B | C | D | D' | E |
| $H_2S$ | 0.65 | 0.70 | 0.015 | 38.16 | 32.70 | — |
| $CO_2$ | 2.30 | 3.37 | 2.38 | 57.24 | 54.24 | 2.42 |
| $N_2$ | 4.20 | 5.71 | 5.82 | — | 6.90 | 39.96 |
| $H_2$ | 55.00 | 53.44 | 54.42 | — | — | 57.56 |
| $CH_4$ | 27.60 | 26.82 | 27.31 | — | — | — |
| CO | 7.40 | 7.19 | 7.32 | — | — | — |
| HCN | 0.10 | 0.10 | 0.015 | 4.60 | 0.46 | — |
| COS | 0.0004 | 0.002 | — | — | 1.29 | 0.06 |
| CS | 0 | 0 | — | 0 | 0.74 | — |
| OTHER | 3.3996 | 2.668 | 2.72 | — | 3.67 | — |
| TOTAL | 100.00 | 100.00 | 100.00 | 100.00 | 100.00 | 100.00 |

TABLE VIII — FIG. 7D

| QUANTITIES IN kg-mol/hr | | | | | | | |
|---|---|---|---|---|---|---|---|
| kg-mol/hr \ POINTS | A | B | C | D | D' | E | F |
| $H_2S$ | 34.24 | 37.96 | 0.79 | 33.17 | 35.47 | 3.72 | — |
| $CO_2$ | 121.15 | 182.58 | 126.83 | 55.75 | 58.83 | 61.43 | — |
| $N_2$ | 221.22 | 309.70 | 309.70 | — | 7.49 | 88.48 | — |
| $H_2$ | 2,897.00 | 2,897.00 | 2,897.00 | — | — | — | — |
| $CH_4$ | 1,453.77 | 1,453.77 | 1,453.77 | — | — | — | — |
| CO | 389.78 | 389.78 | 389.78 | — | — | — | — |
| HCN | 5.27 | 5.27 | 0.79 | 4.48 | 0.50 | — | — |
| COS | 0.02 | 0.12 | 0 | 0 | 1.4 | 0.1 | — |
| $CS_2$ | 0 | 0 | 0 | 0 | 0.8 | 0 | — |
| OTHER | 144.82 | 144.82 | 144.82 | — | $(NH_3)$ 3.98 | 0 | — |
| TOTAL | 5,267.27 | 5,421.00 | 5,323.48 | 97.40 | 108.47 | 153.73 | — |
| SULFUR (kg-atoms/hr) (FINAL PRODUCT) | | | | | | | 34.65 | ic stoichiometric ratio at all times and some excess of one or the other reactant is inevitable.

METHOD FOR SUBSTANTIALLY COMPLETE REMOVAL OF HYDROGEN SULFIDE FROM SULFUR BEARING INDUSTRIAL GASES

CROSS-REFERENCES TO RELATED APPLICATIONS

This application is a continuation-in-part of Ser. No. 693,991 filed June 8, 1976, now abandoned.

BACKGROUND OF THE INVENTION

This invention relates to the alleviation of industrial air and water pollution and particularly to the removal of sulfur pollutants from industrial exhaust gases.

Industrial gases such as coke oven gas, natural gas and various artificially-produced fuel gases are used either by industrial plants to make useful products or burned in suitable combustion apparatus to produce heat. These gases are composed of varying mixtures of hydrogen, carbon monoxide, various aliphatic and aromatic hydrocarbons, hydrogen sulfide, hydrogen cyanide, carbonyl sulfide and other combustibles. The presence of sulfur compounds in such industrial gases is particularly undesirable because of possible corrosion of intermediate gas transmission lines and other apparatus by the gases, possible contamination of chemical substances made from the gases, and possible discharge of undesirable concentrations of sulfur oxides to the atmosphere during combustion of the gases.

In the past such industrial gases have often been treated by passing them through absorption-desorption processes of various types. These absorption-desorption processes give off so-called foul gases which are treated to recover the sulfur present in the gas and thus prevent its discharge to the atmosphere.

Typical absorption-desorption processes are the hot potassium carbonate process, the vacuum carbonate process, the amine processes, especially those using mono-di-, and triethanolamine, and various other processes using organic solvents. The alkanolamine processes and particularly the diethanolamine and monoethanolamine processes have proven to be especially attractive from an industrial standpoint due to their attractive economics and relatively trouble-free operation. The monoethanolamine processes in particular have proven to be very convenient and efficient in removing hydrogen sulfide and other sulfur compounds from sulfur-containing gas streams. Monoethanolamine solutions can easily remove substantially the entire sulfur content from industrial gases so that the gas leaving the monoethanolamine absorber contains no more than 10 grains of sulfur per 100 standard cubic feet of gas exhausted, a very small amount.

These absorption-desorption type processes, while effective to reduce the sulfur content of treated industrial gas to a very low level, do recover the acid gases in a more concentrated form. The recovered "foul" gases have to be treated in turn to remove their sulfur content in some satisfactory manner. Very frequently the foul gases from the absorption step have been used to produce elemental sulfur by some variation of the so-called Claus process. In this process a portion of the sulfur removed, usually in the form of hydrogen sulfide, is oxidized to sulfur dioxide and the sulfur dioxide and remaining hydrogen sulfide are then reacted in a catalytic converter to form elemental sulfur and water.

There are a number of industrial variations of the basic Claus process in which either an initial portion of the hydrogen sulfide is oxidized to sulfur dioxide or a portion of the final elemental sulfur product is subsequently oxidized to sulfur dioxide for use in the Claus reaction. The Claus reaction may be conducted either in the gas phase by mixing the two gases in appropriate apparatus, in which case the process is usually referred to either as the Claus process or a gas phase sulfur recovery process, or the reaction may be conducted in the liquid phase. The liquid phase process is conducted by dissolving one or both of the component sulfur base reactant compounds in a liquid and then either passing the other reactant compound through the liquid or bringing together two parts of liquid in which the reactants are dissolved. Such liquid reaction medium processes, which are frequently referred to as liquid phase sulfur recovery processes, are usually run at lower temperatures than the more usual Claus type processes and have certain other advantages as well.

The Claus process and the other related processes for the recovery of elemental sulfur such as the liquid reaction medium processes are fairly efficient, but have the disadvantage that there is invariably a residue of gas known as the tail gas in which either sulfur dioxide or hydrogen sulfide or frequently both remain. This tail gas must be disposed of in some manner and is usually at this point discharged to the atmosphere.

While the total amount of residual sulfur compounds contained in the tail gas and discharged to the atmosphere is much reduced from the concentrations of sulfur in the original gas treated, there is still, due to inherent inefficiencies of the system, a residual amount of sulfur in the remaining tail gas which may be objectionable. The amount of this remaining sulfur can be decreased by subsequent processing, for example, by the use of several Claus type reactors in series, but due to the small amount of remaining sulfur components in the final tail gas any further processing becomes more and more inefficient and expensive and there is a final minimum of sulfur which is impossible to remove.

One fairly simple expedient for final treatment has been to oxidize all the remaining sulfur compounds to sulfur dioxide and then wash the sulfur dioxide out of the gas with a simple water wash system. The wash water can then be discarded, or used if it is concentrated enough to make sulfuric acid. However, the amount of sulfur dioxide dissolved in the water is insufficient for really effective use as a source of sulfur, yet it is undesirable to waste the sulfur values by discarding the wash water.

The Claus process in particular exhibits a fairly poor recovery of sulfur based upon the amount of sulfur in the original gas and it is customary to use three or even four Claus reactors in series in order to effect recovery of more than 85 to 95% or occasionally as much as 97% of the sulfur removed from the original gas.

Some of the many liquid reaction phase processes are, on the other hand, significantly more efficient so far as the percentage of the original sulfur content which is removed from the gas as elemental sulfur is concerned. However, there is always some small amount of sulfur left in the final tail gas which it is substantially impossible to remove. One of the difficulties is that even with the best control and mixing of the two gases H$_2$S and SO$_2$, it is inevitable that one or the other of the two reactant gases will be present in some degree of excess and such excess will pass unreacted through the process. It is simply impossible under industrial conditions to exactly meter the two gases together in an exact stoichiometric relationship. Usually, of course, other reacting conditions will also not be completely favorable for completion of the reaction so that a quantity of one gas or the other, and very often both, is left unreacted. Sometimes it is decided beforehand which gas is most desirable or least detrimental to have in excess and this gas is then deliberately supplied in a slight excess in order to assure that substantially none of the other gas remains at the end of the process. Usually $SO_2$ will be preferred in the tail gas rather than $H_2S$ because $SO_2$ is less objectionable to the senses than $H_2S$ in similar concentrations.

The relative amounts of hydrogen sulfide, carbon dioxide, water vapor and extraneous hydrocarbons in the foul or acid gas fed to Claus reactors have a pronounced influence on the recovery efficiency for a given number of reactors. As pointed out above there is a limit to the number of reactors which can practically be used to reduce the sulfur compounds in the tail gas. There is also a limit to the preciseness with which an operation can be run in order to keep the reaction exactly in balance and prevent decreases in the conversion of the sulfur compound gases to elemental sulfur due to variations from precise stoichiometric ratios of the reacting gases. The reversible reaction

$$2H_2S + SO_2 \rightleftharpoons 3S + 2H_2O \tag{1}$$

of the Claus process cannot, furthermore, be completed to the right of the equation because of limitations of the thermodynamic equilibrium at temperatures above 250° C. at which the Claus reaction is run. Sufficient water and sulfur vapor is always present to limit the desired reaction. Carbon dioxide and additional water vapor in the feed gas are also diluents which shift the equilibrium adversely. Exact air/acid gas ratio control is also never continuously achieved even with the most sophisticated instrumentation, because of uncontrollable variations in the feed rate and composition of the gases. Hydrocarbons in the feed also affect the plant efficiently by increasing undesirable side reaction products such as COS and $CS_2$, which are difficult to convert to elemental sulfur. The tail gas from a single Claus reactor may as a result contain as much as 10% of the sulfur originally removed by the absorption system from the fuel gas.

A number of processes have been proposed as "clean-up" processes for further treatment of Claus unit tail gas. Several of these depend upon treatment of the tail gas so that the residual sulfur values occur as hydrogen sulfide which is then converted to sulfur in a so-called Stretford unit. There are a number of other proposals for improved clean-up of the tail gas including the use of improved catalysts in the Claus reactor, wet scrubbing, reaction with ammonia, high temperature sulfur dioxide removal, concentration of sulfur dioxide by absorption, catalytic sulfuric acid production, absorption on carbon and absorption-desorption type chemical removal. Some of these proposals are applied to the tail gas after incineration to change all the sulfur values to sulfur dioxide. While some are fairly efficient, at least in the laboratory, in removing the sulfur components, many have proved impractical under industrial conditions and none is completely efficient in removing sulfur compounds.

One notable yet fairly typical example of a Claus-type process in which residual $H_2S$ is oxidized to $SO_2$ is shown in U.S. Pat. No. 1,915,364 issued June 27, 1933 to J. W. Harrel. Harrel separates a gas having a high content of $H_2S$ into two portions. One portion is sent to a burner or furnace where it is burned with $O_2$ to $SO_2$. The $SO_2$ is absorbed into a water solution which is then passed concurrently or countercurrently to the remainder of the $H_2S$ gas in a reaction tower where the Claus reaction converts $H_2S$ and $SO_2$ to elemental sulfur and water. In order to eliminate side reactions and possible loss of sulfur an excess of $H_2S$ is maintained in the reactor. This excess results in residual $H_2S$ gas leaving the reactor with the solution, which $H_2S$ is then separated from the solution and returned or recycled back to the burner or furnace where it is burned or oxidized with oxygen to form additional $SO_2$ required for the Claus reaction. Some of this $SO_2$ eventually escapes through a vent on the top of the absorber where the $SO_2$ is absorbed by water, but no $H_2S$ leaves the apparatus and pollution of the air with $H_2S$ is thus said to be completely eliminated. The elemental sulfur formed in the Claus reaction is separated from the water suspension by any suitable method such as filtering or the like.

Harrel is fairly typical of prior processes in which excess $H_2S$ is oxidized subsequent to the claus reaction. Many later processes have, however, attempted after oxidizing the $H_2S$ to remove the resulting $SO_2$ from the tail gas by the use of additional removal apparatus, none of which has proved to be really practical or efficient under industrial conditions. A number of processes for the treatment of tail gas from sulfur recovery plants for the minimization of sulfur emissions are summarized in the following articles.

(a) "Reduce Claus Sulfur Emissions" by C. B. Barry *Hydrocarbon Processing* April 1972 pages 102–106
(b) "Production of Clean Energy and Sulfur Recovery" by Mikio Harima *Chemical Economy and Engineering Review*, Vol. 6 No. 8 (No. 76), August 1974, pages 13–21 et seq.

Recycling per se in connection with sulfur recovery processes is, of course, not in itself new as illustrated by the Harrel patent noted above, and a large number of processes have been developed which specifically make use of the broad principle of recycling in order to increase the recovery of the sulfur compounds from a gas. For example, normal Claus reactor tail gas containing both $H_2S$ and $SO_2$ has been oxidized to convert all residual $H_2S$ to $SO_2$ and the $SO_2$ has then been recycled back to the Claus reactor to replace a portion of the $SO_2$ used in the reactor. In some proposals the $SO_2$ has been absorbed from the tail gas into lime or the like and then regenerated from the lime and recycled into the Claus reactor.

Several processes have been developed in which $H_2S$ and $SO_2$ are reacted together in a liquid reactor medium of some suitable composition. The liquid reaction medium may be renewed at intervals by stripping gases and volatilizable components including, for example, $H_2S$ which is then recycled to the primary reactor. Occasionally an ammonium salt solution such as an ammonium sulfite solution has been used as the reaction or absorption solution and in these cases excess $H_2S$ or $SO_2$ passing from the solution may be recycled back to reconstitute the absorption solution. It has also been proposed to recycle the entire tail gas stream containing both $SO_2$ and $H_2S$ from a Claus reactor back to an original coke oven gas stream to react with the ammonia in the coke gas. More recently it has also been proposed to use a so-called molecular sieve to reversibly adsorb H₂S from a tail gas derived from a Claus reactor and recycle it back to an absorption step.

While prior workers have, therefore, used the principle of recycling in various ways in connector with sulfur removal systems for the desulfurization of industrial gas, such prior systems have not been completely successful in eliminating exhaust of sulfur components to the environment and have in many cases been expensive to build or uneconomical to operate. Furthermore, while a great many prior workers have made use of the basic principle of recycling various sulfur compounds back to various parts of the processes for retreatment in order to increase the recovery of the sulfur compounds, none has conceived or used the novel arrangement developed by the present inventors.

SUMMARY OF THE INVENTION

The foregoing problems and difficulties associated with the prior art methods of removing minor amounts of hydrogen sulfide remaining in industrial gases after conversion of the major amount of hydrogen sulfide to elemental sulfur have now been obviated by the present invention. In accordance with the invention a reaction loop is established which includes an absorption-desorption process zone or unit and a liquid phase sulfur reaction zone or unit. The tail gas from the liquid phase reaction process is recycled back to the gas entering the absorption-desorption apparatus. An excess of $H_2S$ is maintained in the liquid phase sulfur reaction apparatus to insure that no $SO_2$ is recycled. Since the absorption-desorption system is extremely efficient in removing $H_2S$ from the gas stream, substantially all of the sulfur values in the original gas can be removed. Less than 0.2288 grams of sulfur values per standard cubic meter, i.e. 10 grains per 100 standard cubic feet of gas, remain in the gas stream exhausted from the absorber. This is a very small amount. The process can be combined with a Claus type process wherein the foul gas derived from the absorption-desorption system initially passes through one or more Claus type reaction units prior to passage through the liquid phase sulfur reaction unit.

It is important in the invention that the principal amount of the $H_2S$ content of a gas stream is initially removed by passing the gas through an absorption type acid gas removal apparatus which has a good selectivity and efficiency in the removal of $H_2S$ from a gas stream. It is also important to continuously maintain a molar ratio of $H_2S$ to $SO_2$ of greater than the stoichiometric ratio of 2 and preferably less than 2.5 in order to form elemental sulfur from a reaction of all of the $SO_2$ with the $H_2S$ present, leaving an excess of $H_2S$ sufficient to assure that there is in fact complete reaction of the $SO_2$. More preferably the ratio of $H_2S$ to $SO_2$ should be maintained between about 2.1 and 2.5 or even more preferably between about 2.1 and 2.3. At least the last stage of the reaction of the $H_2S$ with $SO_2$ must be accomplished in a low temperature reaction zone in which the temperature is maintained at not greater than 160° C. The low temperature reaction is run preferably in a liquid phase sulfur reactor. The hydrogen sulfide-containing tail gas is then recycled back to the original gas stream, usually just prior to its contact with the absorption medium.

Absorption with alkanolamines and equivalent absorption solutions is very efficient in removing substantially all the $H_2S$ content from the gas stream. Thus any recycled $H_2S$ which is returned to the feed gas stream with the recycled tail gas is immediately removed from the gas stream again and returned to the reaction zone for reaction with the $SO_2$ according to the basic Claus Reaction 1 above. This reaction is not as efficient in removing the sulfur components of the gas by formation of elemental sulfur as the foregoing absorption processes are in removing the $H_2S$ from the original gas stream. The provision of an excess of $H_2S$, however, and the use of a final low-temperature liquid phase reaction zone assures that substantially all of the $SO_2$, which is not as efficiently removed by the alkanolamine or other suitable absorption system as $H_2S$, will be reacted to form elemental sulfur, while the remaining $H_2S$ can be recycled to the main gas stream and retreated in the absorption system where it is very efficiently removed. Practically all of the recycled $H_2S$ can be absorbed from the gas stream by the absorption system so that for all intents and purposes none reaches the atmosphere. The sulfur removal system thus can, in accordance with the instant invention, be made into an effectively closed system to prevent escape of any gaseous sulfur component at all from the desulfurization and sulfur-recovery system.

Only elemental sulfur in liquid or solid form is removed from the sulfur-removal system. The only gaseous sulfur compounds which can escape from the system are those very small amounts which are not initially absorbed by the absorbing medium and which pass from the absorber with the desulfurized gas. Thus the sulfur exiting from the sulfur removal system can be reduced to a level well below 0.2288 grams of $H_2S$ per one standard cubic meters of gas, i.e. 10 grains of $H_2S$ per 100 standard cubic feet of gas.

In order to prevent the occurrence of any $SO_2$ in the recycled tail gas, which $SO_2$ would not be as effectively removed by or absorbed into the absorbing solution, at least the last stage of the Claus-type reaction, i.e. the reaction of $H_2S$ with $SO_2$, should be conducted at a temperature below about 160° C, and preferably 140° C or lower, in a liquidphase reactor. This will result in the emission of a tail gas containing some $H_2S$ and $CO_2$ and possibly some other gases, but, for all effective purposes, no free $SO_2$. Consequently, if this gas stream is then recycled back to the process prior to the initial $H_2S$ absorbing step, there is substantially no possibility of any sulfur escaping from the sulfur removing process of the invention in a gaseous form. Normally where the Claus type sulfur reaction is to be run at less than 160° C it will be carried out in a liquid-phase reactor.

It is possible for there to be several stages used in the sulfur removal operation as is customary in the normal Claus reaction. The initial stages can comprise high temperature gas-phase reactors, but at least the last stage must be a low-temperature reactor such as a liquid-phase sulfur reactor. This is because no $SO_2$ must remain in the tail gas from the reactor and it is characteristic for a small amount of unreacted $SO_2$ to remain in the tail gas from a high-temperature gas-phase reaction because the thermodynamic equilibrium is not conducive to complete reaction of the $SO_2$. Naturally the entire sulfur removal reaction may be run in the liquid phase with very effective results.

BRIEF DESCRIPTION OF THE DRAWINGS

FIG. 2 is a schematic type diagram, of an apparatus arrangement for the practice of one version of the process of the invention for removing hydrogen sulfide from industrial gas streams.

FIG. 4 is a schematic type diagram, of an apparatus arrangement for the practice of an alternative embodiment of the process of the invention.

FIG. 5 is a block diagram type flow sheet of another embodiment of the invention applied to the desulfurization of coke oven gas.

FIG. 6 is a block diagram type flow sheet of still another simplified embodiment of the invention which includes for reference designations of gas flows and compositions attained with the invention.

FIGS. 6A, 6B, 6C and 6D are tables setting forth the compositions of gases at various points designated in the apparatus shown in FIG. 6.

FIG. 7 is a block diagram flow sheet of yet another simplified embodiment of the invention for treating an $H_2S$ and HCN containing gas stream which includes for reference designations of gas flows and compositions attained with the invention.

FIGS. 7A, 7B, 7C and 7D are tables setting forth the compositions of gases at various points designated in the apparatus shown in FIG. 7.

DESCRIPTION OF THE PREFERRED EMBODIMENTS

Figure 1:
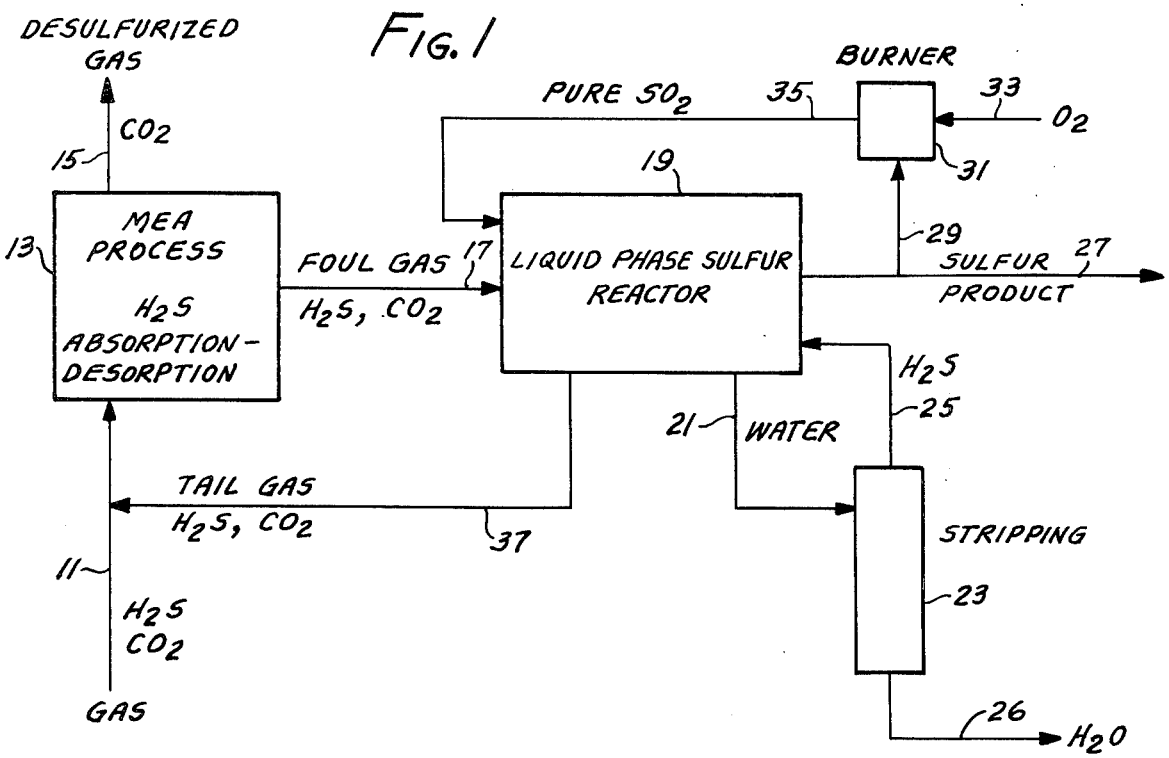
FIG. 1 is a block diagram type flow sheet.

In FIG. 1 there is shown a flow diagram of one embodiment of the invention wherein a feed gas containing hydrogen sulfide ($H_2S$) and carbon dioxide ($CO_2$) as impurities enters the apparatus at 11. This gas may be derived from various sources such as natural gas production facilities or metallurgical processes. Where the feed gas also contains hydrogen cyanide (HCN), such as in coke oven gas, it is preferably treated according to another embodiment of the invention as shown in FIG. 5. The feed gas passes via line 11 to a commercial $H_2S$ absorption-desorption process unit of the alkanolamine type, in this case shown as a monoethanolamine, or MEA, process apparatus 13. In the monoethanolamine process substantially all of the $H_2S$ present in the gas is removed as the gas is contacted in any suitable apparatus with an aqueous monoethanolamine solution. The absorption apparatus may be of several different kinds, for example, a packed tower apparatus, spray contact apparatus and the like. The $H_2S$ will react almost instantaneously with the aqeuous monoethanolamine solution to form monoethanolamine sulfide or hydrosulfide which may then be decomposed by the application of heat to the solution prior to or simultaneous with the stripping of the $H_2S$ from the solution, for example by the use of steam. The monoethanolamine solution is extremely efficient in absorbing practically all of the $H_2S$ from the gas so that the gas which passes from the absorber is substantially free of $H_2S$ and contains at the most less than 0.2288 grams of $H_2S$ per one standard cubic meter, i.e. 10 grains of $H_2S$ or equivalent per 100 standard cubic feet of gas.

Carbon dioxide, on the other hand, takes a significant finite time to react with the water in the monoethanolamine solution to form carbonic acid according to the well-known equilibrium reaction prior to reacting with the monoethanolamine to form a monoethanolamine carbonate or bicarbonate. Thus the $CO_2$ does not tend to be taken up by the monoethanolamine solution as readily, and is consequently not removed from the gas stream as quickly, as the $H_2S$. In general it may be simplistically stated that the molar ratio of $CO_2$ to $H_2S$ absorbed in the absorbing solution will depend principally upon the gas liquid contact area and the gas residence time in the absorber. By controlling the throughput of the gas to the absorber so that only a portion of the $CO_2$ has time to be absorbed, the relative amount of $CO_2$ and $H_2S$ taken up by the absorbing solution can be controlled so that substantially all of the $H_2S$ content of the gas is absorbed, while preferably less than 3 moles of $CO_2$ is absorbed into the monoethanolamine for every mol of original $H_2S$ absorbed plus any $H_2S$ which may be produced by reactions of any carbonyl sulfide (COS) and carbon disulfide ($CS_2$) which may be present in the gas. the remaining $CO_2$ leaves the absorbing apparatus via outlet line 15 along with any other gases which may be present and which are not absorbed into the absorbent solution.

So long as the throughput of the gas to the absorber is significantly faster than the time required to absorb all of the $CO_2$ into the solution the ratio of $CO_2$ and $H_2S$ absorbed will tend to remain substantially constant. While the $CO_2$ passed to the absorber will increase because of the recycle, the amount of $CO_2$ in the system will soon come to an equilibrium and the amount of $CO_2$ in the feed gas and the desulfurized gas will then remain the same with no further buildup in the recycle loop and an equal amount of $CO_2$ in the feed gas stream and the desulfurized gas stream. Since any $CO_2$ absorbed in the absorbing solution in effect takes up absorption capacity which is desired to be used for the absorption of $H_2S$, it is desirable for economic reasons and efficiency to keep the absorption of $CO_2$ as low as possible. For practical reasons the molar ratio of $CO_2$ absorbed to $H_2S$ absorbed should be maintained at not more than 3 to 1. Preferably this ratio should be maintained even lower, for example, at less than 2 to 1 or even 1.4 to 1. A good ratio may be considered to be between 1.4 to 1 and 2 to 1.

the monoethanolamine absorption medium, which is usually in the form of a 10 to 25% aqueous solution, can be broadly replaced with any other liquid absorption-desorption medium which will remove substantially all of the $H_2S$ from the gas which is to be desulfurized. Such liquid media are diethanolamine and triethanolamine solutions and vacuum carbonate solutions such as aqueous sodium or potassium carbonate solutions, aqueous ammonia, or polyhydroxyl alcohols such as propylene carbonate or glycerol triacetate or other equivalent absorbents. The advantages of the present invention are obtained only where the absorption solution has a selectivity such that it will remove substantially all of the $H_2S$ from the industrial gas which is being desulfurized, but will not remove the entire content of any other gas which does not take part in the reaction in the sulfur reactor. Since there are many, many possible absorption-desorption mediums for $H_2S$, alternative systems could be worked out within the confines of the basic concept of the invention. Various possible absorption solutions have been mentioned above and as a further example of the diversity of possible absorbing solutions for removal of $H_2S$ from gas streams reference may be had to the following patents: U.S. Pat. Nos. 3,767,766 to G. H. Tjoa et al and 3,856,921 to A. L. Shrier et al. Applicants have found, however, that their invention can be rendered particularly effective for and applicable to the removal of $H_2S$ from industrial gas streams by the use of alkanolamine type absorption-desorption systems.

More specifically, since monoethanolamine is the only known absorption medium which is effective to remove substantially all organic sulfur compounds, in many cases quantitatively, such as carbonyl sulfide or carbon disulfide from a gas stream, if the maximum removal and recovery of sulfur compounds is to be effected from the gas stream, it is important to use a monoethanolamine solution as the absorption medium if organic sulfur compounds are present. Since the process of the invention is designed, therefore, to remove the ultimate amount of sulfur compounds of whatever kind from the gas stream and prevent such compounds from gaining access to the environment, if the gas stream contains any significant amount of organic sulfur compounds it is much preferred to use a monoethanolamine solution or some other absorption medium having an equal ability to absorb such compounds.

After the absorbed gases are stripped from the monoethanolamine solution in the stripping apparatus - which is not separately shown in FIG. 1 — the stripped gas or "foul gas" is directed via line 17 to a reactor which in this case is shown as a block labeled as a liquid phase suflur reactor 19. A suitable reactor design is shown generally in U.S. Pat. Nos. 2,881,047 and 3,170,766 to F. M. Townsend which disclose the well-known Townsend process. Another acceptable process is the commercially practiced "citrate process", which uses a sodium citratecitric acid solution as a reaction medium. The pH of the solution is controlled. A small part of the sulfur product is oxidized in this process to sulfate ions and must be occasionally or continuously removed by crystallization as glauber salt. The removed sodium ions are replaced by adding NaOH to the solution medium. Thus only a solid byproduct containing some sulfur values must be disposed of. The citrate process is typical of aqueous reaction medium processes. There are a considerable number of other aqueous reaction medium processes, such as the process of U.S. Pat. No. 2,563,437 the reaction medium of which contains aluminum sulfate and sulfuric acid. These aqueous processes operate at pH values ranging from slightly to strongly acidic. Any feasible liquid phase sulfur recovery process can be used as sulfur reactor 19. the apparatus of the liquid-phase sulfur removal apparatus 19 is also shown in additional detail in FIG. 2 hereinafter described. Apparatus 19 is specific to the Townsend process. The aqueous reaction medium processes, such as the citrate process, do not need a solvent distillation unit. Instead they require other facilties such as a glauber salt cyrstallization and removal unit.

In the liquid-phase sulfur removal apparatus 19 the $H_2S$ contained in the foul gas received from the absorption-desportion apparatus via the line 17 is reacted in the well known Claus type reaction:

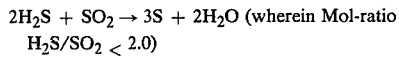
$2H_2S + SO_2 \rightarrow 3S + 2H_2O$ (wherein Mol-ratio $H_2S/SO_2 < 2.0$)

to form elemental sulfur and water. The elemental sulfur precipitates from the reaction medium and is collected at the bottom of the reactor while the water is disposed of by passage from the reactor via line 21 and directed to a stripping column or apparatus 23 where dissolved $H_2S$ is stripped from the water by the steam. The $H_2S$ is then returned as shown in FIG. 1 through line 25 directly back to the liquid-phase reactor 19. Excess $H_2O$ formed in the reaction and from which the gases have been removed is passed through line 26 to disposal or to some appropriate use.

The $SO_2$ for the reaction in reactor 19 is obtained by burning some of the elemental sulfur product which is withdrawn from the reactor 19 in a molten condition through line 27 to storage, usually also as liquid sulfur, or to use in various manners also not shown. The portion of the elemental sulfur product which is to be burned is tapped off line 27 through branch line 29 to sulfur burner 31 where the sulfur is burned with air, oxygen-enriched air, or pure oxygen received through line 33 to form $SO_2$ which is then passed via line 35 back to the reactor 19. Only sufficient elemental sulfur product is burned to provide less than one mol of $SO_2$ for every two moles of $H_2S$ fed to the reactor through the line 17. It will be understood that the necessary $SO_2$ gas could be provided in other suitable manners, not illustrated, such as from some external source or by initial partial combustion of some of the foul gas passed through the line 17 either by splitting the gas stream into two parts and burning only one part or by supplying only sufficient oxygen to the gas stream so that only a portion of the $H_2S$ content is oxidized to $SO_2$. It will be understood that in all cases no more sulfur, whether originally in the form of elemental sulfur or in the form of $H_2S$, will be oxidized, or at least will be passed to the reactor 19, than will constitute less than the stoichiometric ratio of $SO_2$ necessary to react with the amount of $H_2S$ passed to the reactor in the foul gas in line 17. Preferably the ratio of $H_2S$ to $SO_2$ will be maintained between 2 and 2.5, or more preferably 2.1 and 2.5, or even more preferably between 2.1 and 2.3.

While it is theoretically possible for the $H_2S$ gas to be oxidized to provide $SO_2$, it is as a practical matter necessary for the $SO_2$ to be generated by the burning of a portion of the elemental sulfur product if there is any significant amount of carbon compounds in the foul gas entering the reactor 19 through the foul gas line 17. This is because if a portion of the foul gas is oxidized side reactions will form contaminating compounds of sulfur and carbon such as $CS_2$ and COS along with the $SO_2$. These contaminating compounds, usually formed in equilibrium quantities at any given temperature, pass through the reactor and, upon recycle, show up in the absorption-desorption step with detrimental effects upon both the absorbent solution and the efficiency of the process in removing sulfur compounds from the industrial gas stream. Specifically, carbonyl sulfide, COS, is absorbed by the monoethanolamine solution and is hydrolyzed to $H_2S$ and $CO_2$ by a complex mechanism. Carbon disulfide, $CS_2$, is only partially absorbed. However, the absorbed portion produces one molecule of $H_2S$ and one molecule of a thiourea-type compound that consumes one mole of monoethanolamine. The thiourea compound is eventually recovered as a solid sludge from the "reclaimer" of the absorption-desorption type desulfurizer, not shown. The non absorbed portion of the $CS_2$ finds its way to the desulfurized gas and thus decreases the overall sulfur removal efficiency of the process. The sulfur values converted to COS and $CS_2$ in a Claus-type reaction are roughly equal. All the compounds $SO_2$, $CS_2$, COS and even elemental sulfur itself are highly corrosive and highly reactive in the tail gas and it is very desirable that a tail gas containing such compounds shall not be recirculated to additional apparatus. Thus, although the use of the preferred monoethanolamine absorbent in the absorber will remove substantially all organic sulfur compounds either partially or completely from the gas stream being treated, it is desirable to minimize the production of organic sulfur in the system. When the elemental sulfur product itself is burned to produce $SO_2$ only a minute amount of sulfur-carbon compounds are formed derived from the relatively dilute $CO_2$ in the air if air is used as the oxidizing gas.

In the process shown in FIG. 1, the $H_2S$-absorption desorption step 13 produces a foul gas stream 17 that contains substantially no COS and no $CS_2$. Since the sulfur-burner 31 and the liquid phase sulfur reactor 19 also produce no COS and $CS_2$, the tail gas in the recycle line 37 contains substantially none, and the overall process of FIG. 1 can be said to be converting most of the COS and $CS_2$ which may occur in the feed gas stream 11 to other products and to produce no new COS and $CS_2$.

The overall sulfur recovery efficiency of the process depends upon the thermodynamic equilibrium in the last stage of the step in which the Reaction 1 is allowed to proceed. Even with a surplus of unreacted $H_2S$, it is impossible to eliminate all $SO_2$ from the tail gas as along as the last stage is allowed to proceed in vapor phase above 160° C., because the thermodynamic equilibrium does not drive the reaction far enough to the right. Only in liquid-phase or equivalent reactions, operating preferably well below 160° C., with the mass action of a significant surplus of unreacted $H_2S$, and with the selective $SO_2$ retention of various liquid-phase reaction media, is it possible to virtually eliminate $SO_2$ from the tail gas. Since $SO_2$ is in general more soluble in many liquids than $H_2S$, it tends to be retained in solution in the liquid reaction medium until it reacts with the excess $H_2S$ passing through the liquid. Thus it is desirable to use a reaction liquid which has a fairly high solubility with respect to $SO_2$. Various aqueous reaction solutions in general conform to the requirement. However, any other liquid reaction mediums in which $SO_2$ is significantly more soluble than $H_2S$ will be satisfactory.

It is for this reason that it has been found necessary when only a single-stage sulfur removal step is used as in FIG. 1, that such a step constitute a liquid phase type process such as the so-called Townsend process. Also, as will be explained in more detail later, it is necessary in the present invention, if a Claus type reactor is to be used, i.e. a reactor in which the reactions occur in the gas phase at more than 160° C., for there to be at least two stages for sulfur recovery. The initial stages can constitute Claus-type burners and/or reactors, but at least the final stage must be a liquid-phase type process such as the Townsend process operating at less than 160° C., and preferably not greater than 140° C. or less. In this case the bulk of the sulfur values are converted in the initial Claus reactors and the $SO_2$ content of the tail gas is then decreased to essentially zero in the final liquid phase stage. However, the sulfur recovery selectivity of this type of multiple stage process is far from ideal. This is because while the foul gas from the absorber-desorber is free of COS and $CS_2$, the initial Claus reaction stage or stages (commonly, the Claus thermal reactor) produce the usual quantities of COS and $CS_2$ which then pass unreacted through the final liquid-phase stage and are totally recycled to the $H_2S$ absorption-desorption step. In the absorption desorption stage the COS is practically totally converted to $H_2S$ and $CO_2$, and $CS_2$ is converted to one mole of $H_2S$ and one mole of thiourea-type compound that consumes monoethanolamine. The sulfur removal efficiency of the process of FIG. 1 is thus slightly decreased, namely by the slightly higher amount of $CS_2$ left in the desulfurizer gas. However, no sulfur values are discharged from the process into the atmosphere nor into any water streams.

Since the Claus reaction $$2H_2S + SO_2 \rightleftharpoons 3S + 2H_2O$$

and also the preliminary reaction of $H_2S$ with oxygen according to the reaction $$2H_2S + 3O_2 \rightarrow 2SO_2 + 2H_2O \qquad (2)$$

(where this reaction is used to form $SO_2$ for use in the subsequent Claus reaction rather than using the combustion of a portion of the elemental sulfur derived from the Claus reaction) both result in the formation of water as a reaction product, a fair amount of $H_2S$ is dissolved in the water generated. This water must eventually be disposed of in some manner. If this water was removed from the process without removing the dissolved $H_2S$, the process would constitute a loss of sulfur from the system. Thus the dissolved $H_2S$ is preferably separated from the water by means of heat desorption or the like and is recycled either to the liquid phase sulfur removal step, or to a Claus process step, or less preferably may be combined with the $H_2S$-containing tail gas which is returned to the absorption step.

In FIG. 1 the tail gas from the liquid-phase reactor 19 is recycled via recycle line 37 back to the line 11 which conducts the $H_2S$ containing feed gas to the absorption-desorption apparatus 13. The recycle line carries a fairly large amount of $CO_2$ which has passed through the reactor 19 unchanged and a small amount of $H_2S$ which has passed through reactor 19 unchanged. This gas is combined in the line 11 with the $H_2S$ and $CO_2$ entering the system and passes into the absorption-desorption apparatus 13 where conditions have been predetermined to be such that substantially all of the $H_2S$ is absorbed from the gas leaving less than 0.2288 grams of $H_2S$ per standard cubic meter, i.e. less than 10 grains of $H_2S$ per 100 standard cubic feet of gas. Some additional $H_2S$ may be produced by the reaction of any COS and $CS_2$ contained in the gas in the MEA absorbing solution.

Because acid gases such as $CO_2$ dilute the $H_2S$ in the liquid-phase sulfur reactor 19 and might thereby adversely affect the effectiveness of sulfur recovery, it is very desirable to limit the absorption of large amounts of these acid gases in the absorption-desorption step 13. In the present state of the art it is possible to design and operate MEA-process absorption-desorption units with an $H_2S$-selectivity such that no more than about 1.4 to 2.0 volumes of $CO_2$ are absorbed for each volume of $H_2S$. Once this ratio is fixed, in the recycle system of FIG. 1, the $CO_2$ content in the desulfurized gas line 15 is the same as the $CO_2$ content in the feed gas line 11. The $CO_2/H_2S$ absorption ratio in step 13 simply determines the $CO_2$ content of the recycle stream 37. A high $CO_2/H_2S$ absorption ratio will cause the absorption step 13 to become overloaded unnecessarily with $CO_2$ and makes the step expensive to build and to operate. Thus it is very desirable to use a low $CO_2/H_2S$ absorption ratio in the process of this invention. Any conventional method of operation which limits the $CO_2$ pickup may be used.

Ordinarily the gas stream will simply be driven or passed rapidly through the absorption zone, allowing only a short residence time for gas-contact with the alkanolamine absorbent. The rate of $H_2S$ absorption is considerably faster than the rate of $CO_2$ absorption and by allowing only a limited residence time for gas-liquid contact, it is possible to selectively absorb $H_2S$ in the presence of larger amounts of $CO_2$. This technique is effective with all alkaline absorbents of acid gases in various degrees. It is also effective with monoethanolamine solutions. Thus, in a recycle system consisting of an absorption-desorption type desulfurizer, and a Claus reaction type sulfur plant, it is possible to selectively absorb substantially all of the $H_2S$ in the desulfurizer while leaving a large fraction of the $CO_2$ in the gas, so that, when the absorbed fraction of $CO_2$ is eventually recycled from the sulfur removal apparatus it does not become undesirably concentrated in the recycle gas stream but remains instead largely in the desulfurized gas.

What has been said of the $CO_2/H_2S$ absorption ratio and its effects on the process is also largely true for the $HCN/H_2S$ absorption ratio where the feed gas also contains HCN. However, there is one difference. While the $CO_2/H_2S$ absorption ratio can be influenced by design and operation measures, there is not much, short of water washing or chemical treatment, that can be done to affect the $HCN/H_2S$ ratio, because the absorption rates of $H_2S$ and HCN are not as different as those of $H_2S$ and $CO_2$. In the process of FIG. 1 if the industrial gas stream contains HCN in addition to $H_2S$ and $CO_2$, such as in coke oven gas, the HCN cannot simply be ignored but should preferably be removed from the foul gas before the foul gas enters the liquid phase sulfur reactor. Any HCN present in the foul gas stream is absorbed into the liquid reaction medium as cyanide ions ($CN^-$) which react with the elemental sulfur also present forming thiocyanates ($SCN^-$). This side reaction in the liquid phase sulfur reactor consumes sulfur values. Since the thiocyanates do not readily decompose, they cannot be expelled from the reactor solution and thus accumulate in the liquid reaction medium. Over a very short period the HCN can be ignored because the concentration of thiocyanate in the liquid reaction medium will be low enough to not affect the process. For a continuous process the thiocyanate will quickly accumulate to the point where the reaction medium becomes ineffective. This problem can be alleviated by continually bleeding off a portion of the liquid reaction medium and replacing with fresh medium. While the process is now a continuous operation, there is still a disposal problem of the deteriorated liquid reaction medium that has been bled off and a loss of sulfur values. Currently, there does not exit a liquid reaction medium for the liquid phase sulfur reactor that is inert to HCN so that the presence of HCN in a feed gas can be ignored without causing a high concentration of thiocyanates in the system. Accordingly, where HCN is present in the feed gas, the preferred embodiment of the invention is that disclosed in FIG. 5 for treating coke over gas and is described in detail hereinafter.

The $CO_2$ which passes through the absorbing solution, plus $N_2$ and other inert or non-acid gases which pass through the solution, leave the absorber in the desulfurized gas in line 15 which will occasionally constitute an exhaust line to the atmosphere, but will usually be a line to some further treatment or use of the desulfurized gas. The gas in line 15 will contain less than 0.2288 grams of hydrogen sulfide per standard cubic meter of gas, i.e. 10 grains of $H_2S$ per every 100 standard cubic feet of gas. Under good operating conditions considerably less sulfur compounds even than this may remain in the final desulfurized gas. It will be noted that there is no other discharge of gases from the system so that the system is very clean with respect to the sulfur compound content of the discharged gases.

In FIG. 2 there is shown apparatus suitable generally for the practice of the process illustrated in FIG. 1 with some minor modifications. In FIG. 2 the gas to be desulfurized which may, for example, be natural gas or other $H_2S$ containing gas first enters a monoethanolamine absorber 51 via feed line 53. Where HCN is present in the feed gas, such as in coke oven gas, the HCN may conventionally already have been removed before it enters the absorption apparatus as may ammonia which is customarily found in coke oven gas. Alternatively and preferably, the HCN can be removed from the foul gas emanating from the absorption/desorption system prior to entering the sulfur recovery unit as depicted in FIG. 5. The absorber 51 may take the form of a spray tower, a packed tower or other conventional countercurrent type gas liquid contact apparatus. The gas after entering the tower will ascent within the tower to the top where the remaining gas or unabsorbed gas will pass from the absorber through line 55 as desulfurized gas. This gas will contain the original $CO_2$ quantity in the gas plus other gaseous components including combustible components. The desulfurized gas may be utilized as a gaseous fuel in a combustion process and the waste gas from said combustion discarded to the atmosphere as a substantially non-polluting gas or may be used for some other purpose.

The MEA solution which enters the top of the absorber as shown via line 57 and the liquid distributor 59 is collected in the bottom of the absorber and is then pumped via line 61 and pump 63 through a heat exchanger 65 to a liquid distributor 67 in a stripper 69. In the stripper the solution is trickled downwardly through rising steam vapor which rises in the stripper. The solution collects in the bottom of the stripping tower and is passed through line 71 to reboiler 73 where the MEA solution is heated by steam coils 75. After being heated in the reboiler the solution is discharged again via line 77 into the bottom of the stripper where it flashes partly into a hot vapor which then passes up through the descending trickle of absorber liquid. The gases stripped from the solution finally pass from the top of the stripper tower via line 79 and are conducted in line 79 to a sparger 81 in the bottom of a sulfur reactor 83.

Line 85 leads from the bottom of the stripper 69 via pump 87 to heat exchanger 65 where some of the heat of the hot solution from the bottom of the stripper 69 is transferred to the cooler solution passing through line 61 from absorber 51 to the stripper 69. The cooled and stripped MEA solution then passes through a heat exchanger or cooling device 89 before passing through line 57 to the liquid distributor 59 in the top of absorber 51.

The $H_2S$ and $CO_2$ which pass from the line 79 into the sparger 81 bubble up in a liquid-continuous, gas-disperse phase through the reaction medium in the sulfur reactor 83 countercurrently to a descending flow of reaction medium from a liquid distributor 91 in the top of the sulfur reactor 83.

Meanwhile $SO_2$ gas which is formed in a sulfur burner 93 by burning elemental sulfur from line 95 with oxygen or air from line 97 is initially passed through a boiler 99 in which the hot $SO_2$ gas heats boiler feed water which enters the boiler through line 101 from some external source and from which boiler steam, which may be used in the plant and in the various reboilers in the process, leaves by line 103. The hot $SO_2$ gas, now partially cooled, passes next into a heat exchanger or cooler 105 where the hot gas is cooled to a temperature appropriate for passage via line 107 into the sparger 109 in the bottom of the reactor 83 from which the $SO_2$ is bubbled into the liquid reaction medium in the bottom of the reactor in the form of discrete bubbles.

Fresh, stripped, or distilled reaction medium enters the liquid distributor 91 from a line 111. The reaction medium may be one of the organic liquids listed in column 3 of Townsend U.S. Pat. Nos. 2,881,047 or 3,170,766 or mixtures of two or more of these organic liquids, or alternatively an aqueous reaction liquid having an ionizable salt dissolved in it as used in the process described in U.S. Pat. No. 2,563,437 or other like processes.

Liquid reaction medium which has passed down the sulfur reactor 83 from the liquid distributor 91 collects in the bottom of reactor 83. The sulfur particles in the liquid settle in the bottom of the reactor in the form of a sulfur slurry which is continuously passed by gravity feed into the sulfur melter 113 as a sulfur slurry. The sulfur melter 113 takes the form of a large shallow tank having a weir 115 at one side. The melter 113 is held under a slight pressure, usually about 3 atmospheres if the reaction medium is an aqueous solution, in order to prevent boiling of the reaction medium as the sulfur is melted. It will be understood, however, that different pressures may be necessary depending upon the boiling temperature of the particular liquid reaction medium which is used.

The sulfur slurry enters the sulfur melting tank 113 at one end or side. The slurry collects behind the weir 115 and the sulfur particles are melted by indirect heat coil 114. The melted particles of sulfur sink to the bottom of the tank 113 and form a lower layer of melted sulfur overlain by a layer of slurry and a superimposed layer of clear liquid reaction medium. The liquid sulfur layer at the bottom of the sulfur melter may be periodically or continuously withdrawn from the melter tank 113 and pumped to the sulfur burner via valve 117, line 119 and pump 121. Excess liquid sulfur product may be passed through line 123 to some further process or storage.

In some cases it may be desirable to operate the sulfur reactor at a temperature above the melting point of sulfur, i.e. about 130° to 140° C., particularly if the reactor is a packed column type reactor. In this case the reaction medium will be comprised of a liquid which has a boiling point higher than the melting temperature of sulfur, for example, glycol or the like. The molten particles of sulfur, unlike solid particles, will not then plug up the packing over a period, and the sulfur melter may consequently constitute merely a settler or collector of molten sulfur. However, the liquid-phase reactor should be operated at a temperature not exceeding 160° C., and preferably below 140° C., in order to avoid handling very viscous liquid sulfur and also in order to attain a reaction equilibrium when an excess of $H_2S$ is present in which no substantial or detectable $SO_2$ remains unreacted. The reaction medium selected may sometimes conveniently have a boiling temperature about that of the desired operating temperature so that vaporization of the medium will aid in maintaining the correct temperature. In this case a condenser will usually be required to condense and return the vapors from the reactor. Alternatively the temperature at which the reaction is conducted may be controlled by means of cooling coils positioned in the reaction section of the reactor.

The liquid portion of the reaction medium which is decanted from the slurry overflowing over the weir 115 in melting tank 113 is passed via valve 124 and line 125 to a still column 129. In still 129 the liquid reaction medium, which has been diluted by the reaction water derived from Reaction 1, is distilled to evaporate said reaction water. The still 129 is provided with the usual reboiler 133 near the bottom and dephlegmator cooler 137 on top. In case the reaction medium consists of aqueous salt solutions, the dephlegmator can be deleted. For processes in which an aqueous reaction medium is used and in which the water serves as a catalyst, sufficient catalytic water is left in the liquid reaction medium to maintain the concentration constant.

The acid gas vapors and water pass through the line 135 to the top of a stripping column 141 where the water vapor and $H_2S$ and other acid gases are separated from each other. At the bottom of the stripper 141 is a reboiler 143 in which the $H_2O$ is heated to drive off dissolved $H_2S$. This gas passes from the top of the stripper 141 through a line 145 and into the line 79 where it is combined with the $H_2S$ and $CO_2$ in line 79 and passed, or in effect recycled, to the sparger 81 in the bottom of reactor 83. Meanwhile the excess $H_2O$ is passed from the bottom of the stripper 141 via line 147 to any convenient disposal.

The bottoms or liquid portion in the still 129 is passed from the still 129 via line 149 and is then pumped via pump 151 through cooling apparatus 152 and line 111 back into the top of the reactor 83 via liquid distributor 91. The cooling apparatus 152 serves to cool the reaction medium sufficiently so that the temperature in the reaction zone of the reactor is maintained at a temperature of not greater than 140° C.

The tail gas from the top of the reactor 83, which tail gas contains principally $CO_2$ and $H_2S$, is passed via recycle line 153 into the feed gas line 53 where the recycled gas and the new feed gas are comingled and passed into the absorber 51 where substantially all of the recycled $H_2S$ and more than one half of the recycled $CO_2$ is absorbed.

The desulfurizing system shown in FIG. 2 thus operates substantially as shown broadly in outline in FIG. 1 by initially absorbing all the $H_2S$ in a feed gas along with various portions of other acid gases into an absorbing solution which is then thermally regenerated. The gas is then passed to a sulfur reactor where the concentrated $H_2S$ content is reacted with a stoichiometric deficiency of $SO_2$ to form elemental sulfur and water. The excess $H_2S$ remaining in the resulting tail gas is then recirculated back to the feed gas stream prior to the absorber. The reaction medium in the sulfur reactor is regenerated in a still and the dissolved $H_2S$ and other acid gases are stripped from the recovered reaction water in a separate stripper and are recycled back to the concentrated $H_2S$ in the foul gas which passes from the absorber stripper to the sulfur reactor.

It is essential for the effective operation of the recycle system that the sulfur reactor be a liquid reaction medium type sulfur reactor operating at no greater than 160° C. and preferably not greater than 140° C. or less, below which temperature it is possible to essentially eliminate $SO_2$ from the tail gas and no COS and $CS_2$ are formed. It is preferable, furthermore, that the amount of $CO_2$ or other acid gases which are to be discharged from the system shall not be absorbed in the absorber in an amount greater than 3 moles of $CO_2$ for every mol of $H_2S$ in such feed gas.

Figure 3:
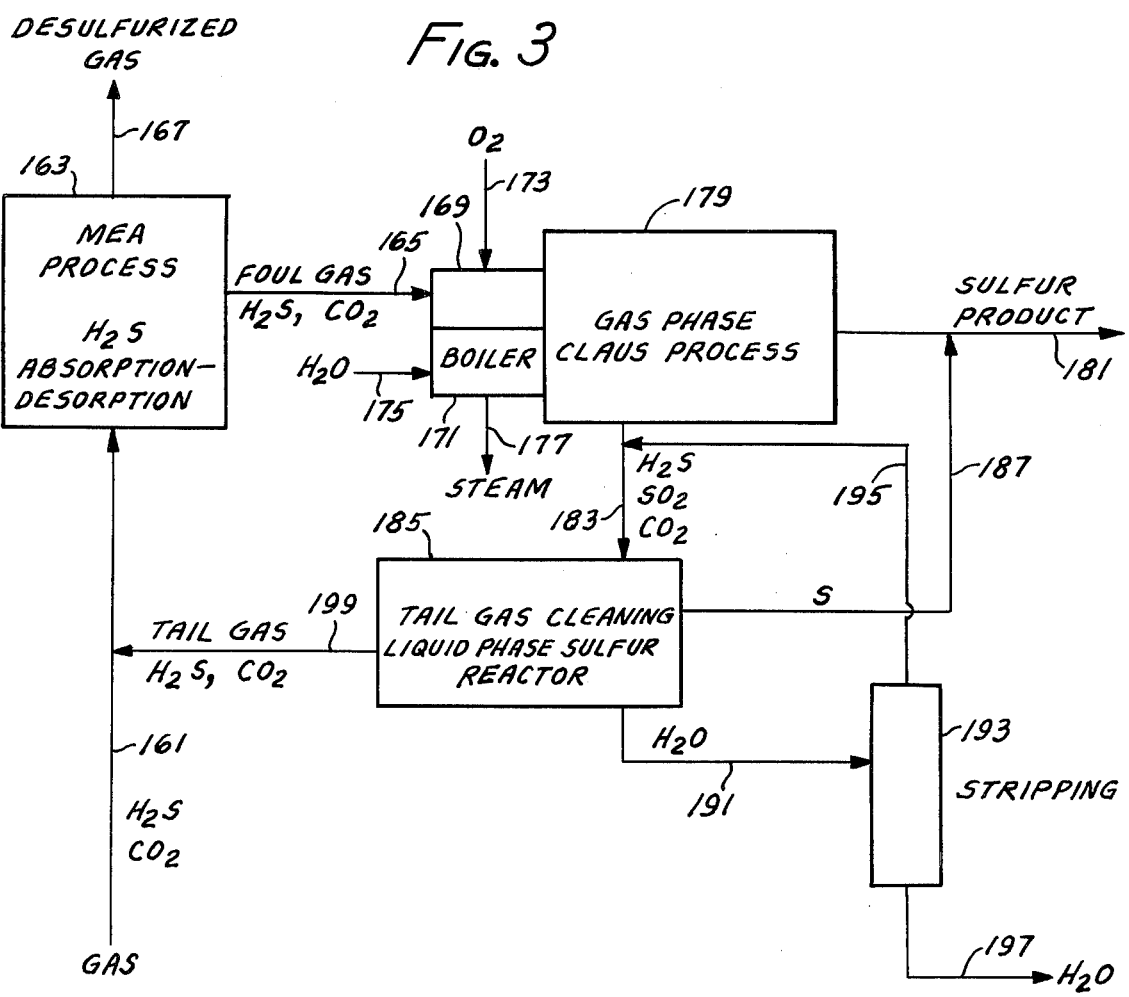
FIG. 3 is a block diagram type flow sheet.

In FIG. 3 there is shown in flow diagram form an alternative embodiment of the present invention in which a two stage sulfur removal process is used. The first stage of the sulfur process is a conventional Claus type sulfur reactor or the like in which the reaction are carried out in a gas phase while the second stage is a liquid reaction medium reactor in which the reactions are carried out in liquid-phase.

In FIG. 3 the gas to be treated enters the apparatus or system through the line 161 and is passed to an absorption-desorption type apparatus 163 of the thermal regeneration type. In the absorption-desorption apparatus acid gas components of the gas and particularly the $H_2S$ content of the gas are absorbed and removed from the gas stream which then exits from the absorber via the line 167 with less than 0.2288 grams of hydrogen sulfide per standard cubic meter, i.e. less than 10 grains of $H_2S$ in every 100 standard cubic feet of gas. As in the embodiments of the invention shown in FIGS. 1 and 2 it will be noted that there is no other discharge of sulfur containing gas from the system as there is no tail gas at all discharged from the subsequent reactors into the surrounding environment.

After thermal regeneration of the absorbing solution in the absorption-desorption unit 163, the regenerated foul gas, which will have a relatively higher content of $H_2S$ than the original gas, is passed through the line 165 into a partial oxidation unit 169 associated with a Claus-type sulfur reactor unit 179. A boiler 171 is also associated with the oxidation unit 169. Oxygen or air enters the oxidation unit 169 through a line 173 and combines with the $H_2S$ and other combustible gas passing into the oxidation unit from the line 165. Only sufficient oxygen or air is provided to oxidize a portion of the $H_2S$ to $SO_2$ in order to maintain the mol ratio of $H_2S$ to $SO_2$ in the gas greater than the stoichiometric reaction ratio of 2. Considerable heat is given off by the partial oxidation of the gas stream and this heat is used in boiler 171 to heat water provided through line 175 and make steam which leaves the boiler through line 177. This steam may be used in the plant generally or may be used to provide heat to the reboiler associated with the thermal regenerator of the absorption-desorption apparatus.

The partially oxidized gas now containing $SO_2$ as well as $H_2S$ and $CO_2$ and also small but significant amounts of COS and $CS_2$ formed during the partial oxidation conditions along with small amounts of elemental sulfur now enters the Claus-type reactor 179 where it is catalytically reacted to form more elemental sulfur and water in accordance with the Reaction 1. Some of the COS and $CS_2$ also react with water vapor to form additional elemental sulfur. The elemental sulfur exits through line 181 while the unreacted $H_2S$, $SO_2$, $CO_2$ and other remaining gases such as $N_2$, COS and $CS_2$ exit through the line 183 which leads into a liquid-phase type sulfur reactor 185. In this reactor 185 the remaining $SO_2$ reacts with the $H_2S$ present to form additional elemental sulfur product and water. The reaction in this reactor is run at low temperature of less than 160° C. and the reaction of $SO_2$ with $H_2S$, unlike the reaction in the Claus reactor, is substantially complete. In addition the liquid-phase process does not result in the formation of any COS or $CS_2$.

The additional elemental sulfur formed in the low temperature liquid phase reactor 185 is passed from the reactor 185 through line 187 which connects with the sulfur product line 181 through which the combined elemental sulfur product then leaves the system. The excess water formed in both reactors 179 and 185 leaves the reactor 185 via line 191 which passes to stripper 193 where the aqueous solution is heated to drive off any $H_2S$ dissolved in the water. The stripped gases may be returned to the inlet to the liquid-phase reactor 185 via line 195 and line 183 while the excess $H_2O$ is removed from the system through line 197. This excess water may be discarded or may be used for some other purpose in the plant. Alternatively the stripped $H_2S$ may be returned to the inlet to the Claus reactor by passing it into foul gas line 165. The small remaining amount of $H_2S$ in the tail gas which passes from the liquid phase sulfur reactor is recycled via line 199 to the original feed gas stream prior to its entrance into the absorber-desorber 163 and is completely reabsorbed in the absorber. As a consequence, no $H_2S$ at all escapes from the system except for the small amount which passes out the line 167 with the desulfurized gas. There is thus no tail gas at all which escapes from the system as a whole.

FIG. 4 shows in more detail a desulfurizer system without a tail gas discharge such as shown in FIG. 3. The initial absorber-desorber arrangement has been shown for simplicity's sake as almost identical and the final liquid phase desulfurizer arrangement has been illustrated as substantially similar to the arrangement shown in FIG. 2. The central portion of the system shown in FIG. 4, which portion constitutes essentially the Claus type reactor portion of the system, is substantially different, however. The same numbers as used in FIG. 2 have been used to identify identical apparatus and those portions of the apparatus which are identical to FIG. 2 have been described only briefly for the sake of continuity. For a more complete description reference may be made to the description of FIG. 2.

In FIG. 4 hydrogen sulfide-containing gas passes through feed line 53 to the bottom of absorber 51. Absorbent solution enters the absorber 51 through line 57 and liquid distributor 59. Almost completely desulfurized gas leaves the system in the line 55. This gas will be desulfurized to have less than 0.2288 grams of hydrogen sulfide per standard cubic meter of gas. Used absorbing solution is passed via line 61 and pump 63 through heat exchanger 65 to liquid distributor 67 in the top of stripping column 69. $H_2S$ and $CO_2$ and other acid gases absorbed or held in the absorbent in loose chemical association is freed from the absorbent solution in the stripping column and passes from the top of the stripping column through the foul gas line 79.

The stripped absorbent solution collects in the bottom of the stripping column 69 where it is continuously pumped via line 71 to reboiler 73, which is heated by heating coils 75, and through return line 77 back to the stripping column 69. The absorbent solution is also pumped via line 85 and pump 87 through the heat exchanger 65, where it gives up some of its heat to the absorbent solution passing from the absorber 51 to the stripping column 69, and thence through a heat exchanger or cooling coil 89, where the absorbent is cooled, and then back through line 57 to the top of the absorber 51.

The $H_2S$ or $CO_2$-containing foul gas from the stripper 69 passes through the line 79 to a burner 239 where the $H_2S$-containing foul gas is partially oxidized by oxygen or air which enters the burner 239 through line 241. Associated with the burner 239 is a thermal reactor 242 and a boiler 243 which makes use of the heat of combustion and also the heat of reaction of the $H_2S$ and $SO_2$ in the thermal reactor 242 to from steam form boiler water which enters the boiler through line 245. Steam from the boiler exits through line 247. The function of the thermal reactor 242 in the system is essentially to allow sufficient residence time for the reaction gases to reach their thermodynamic equilibrium point and to thoroughly intermix.

The amount of oxygen admitted to the burner 239 is insufficient to completely oxidize the $H_2S$ content of the gas and is kept limited so that the ratio of $H_2S$ to $SO_2$ in the oxidized gas is more than 2, or, in other words, greater than the stoichiometric ratio. Preferably this ratio will be maintained between 2.1 and 2.5 or more preferably 2.1 to 2.3. Some of the $SO_2$ immediately reacts with the $H_2S$ in the thermal reactor 242 to form elemental sulfur. This sulfur is entrained as sulfur vapor in the hot gas which leaves the thermal reactor. The hot gases and entrained sulfur vapor are passed through line 249 to a heat exchange or cooling coil 251 where the gases are cooled sufficiently to condense the sulfur vapor to molten sulfur which is then collected in sulfur collecting tank 253 as the cooled gases pass through the upper portions of the tank and out through line 255 to heat exchanger 257 where the gas is reheated before being passed into a catalytic reactor 259 where additional $H_2S$ and $SO_2$ are reacted together to form elemental sulfur and water. The gas passes from the catalytic reactor 259 through line 261 to heat exchanger 257 where it gives up some of its heat of reaction to the gas entering the reactor and then passes through the cooling coil or condenser 263 where the elemental sulfur vapor is condensed to molten sulfur which is then collected in the bottom of the sulfur collector tank 265. The molten sulfur collected in the two sulfur collector tanks 253 and 265 is removed, usually periodically, from these tanks through line 271 which leads to sulfur storage or use facilities, not shown.

The tail gas from the catalytic reactor 259 passes via the collector tank 265 through line 267 to a sparger 272 in the bottom of a liquid phase sulfur reactor 83. The reactor 83 contains a liquid reaction medium in which reaction of the remaining $SO_2$ contained in the tail gas from the catalytic reactor 259 takes place and will remove all final traces of $SO_2$ from the gas. The gas bubbles up from the sparger 271 through the reactor medium liquid in the reactor 83. The tail gas, with substantially every last bit of $SO_2$ reacted with $H_2S$ to form elemental sulfur and $H_2O$, then passes together with the excess $H_2S$ contained in the gas from the top of the reactor 83 through the recycle line 153 back to the original feed line 53 which feeds gas to the absorber 51. None of the tail gas thus has any access to the environment external to the system and no sulfur reaches the environment except as an elemental sulfur product or as that very small amount of sulfur which is able to pass through the absorber with the original gas stream.

The liquid reaction medium is continuously removed from the bottom of the reactor 83 as in FIG. 2 together with precipitated sulfur particles suspended in the liquid and is passed to a sulfur melter 113 where the sulfur particles are melted and allowed to separate in an upper solution layer, an intermediate slurry and a lower molten sulfur layer. The liquid sulfur layer settles behind a weir 115 and can then be pumped or removed through line 123 and valve 117 to storage. The melter 133 is maintained under sufficient pressure to keep the reaction medium solution from boiling at the sulfur melting temperature.

The liquid portion of the reaction medium which overflows over the weir 114 passes as in FIG. 2 through the valve 124 and line 125 to a solvent distillation column 129 where the solution passes downwardly through hot rising vapors from a reboiler 133. Dissolved gases are stripped from the solution in the distillation column and pass out the line 135 through a dephlegmator 137. The condensate flow back to still 129 and the non-condensed vapors are piped into an $H_2O$ stripping column 141. Free $H_2S$ passes from the top of the $H_2O$ stripper column through line 145 to the line 267 which conducts the tail gas from the catalytic reactor 259 to liquid phase reactor 83. Water which contains dissolved $H_2S$ is stripped in the stripper 141 by means of steam generated in a reboiler 143. This strippd gas also passes through the line 145 and recycle line 267 back to the reactor 83. The stripped and essentially gas-free water then passes from the $H_2O$ stripper 141 through line 147 which directs the stripped water to disposal.

The stripped reaction medium in the bottom of the solvent distillation column 129 is passed from the bottom of the column as shown via line 149, into a cooler 152 and then continues via line 111 into the top of the liquid-phase sulfur reactor 83 where it is passed into the reactor from the distributor 91. The cooler 152 serves to reduce the temperature of the reaction medium sufficiently to keep the reaction zone at not greater than 160° C. during reaction and preferably below 140° C.

In FIG. 5 there is shown a variation of the process shown in FIG. 3. This is the preferred method of treating an $H_2S$ and HCN containing feed gas, particularly coke oven gas. The designating numbers and description are identical to that associated with FIG. 3 except for the addition of three lines and an HCN removal step or apparatus. In FIG. 5 a coke oven gas to be desulfurized enters through line 161 and passes to an absorption-desorption apparatus 163 where substantially all the $H_2S$ and much of the content of other acid gases is absorbed and thermally regenerated to provide a foul gas stream in line 165. The desulfurized gas leaves through line 167.

Coke oven gas normally has about 0.04–0.1% of HCN gas contained in it and this HCN is to a large extent absorbed and regenerated in the absorption-desorption apparatus 163. Although the Claus burner burns most of the HCN which passes through it, there is always a sufficient amount left to do considerable damage by corrosion to the sheet steel from which the Claus plant equipment is usually formed in only a matter of a few days. Consequently this HCN must be eliminated from the foul gas before the gas passes to the Claus process.

In order, therefore, to decrease the amount of HCN in the foul gas it is first passed via line 165 to an HCN removal apparatus 321 which comprises absorption and desorption steps, not separately shown, using $H_2O$ as the absorbing solution. The HCN is stripped from the water in a stripping column using a portion of the already desulfurized gas tapped from line 167 through line 323. The desulfurized gas is preheated and passed upwardly through the $H_2O$ in the stripping column, which is not shown, but which may be substantially like the $H_2S$ stripper 69 shown in FIGS. 2 or 4. The stripped HCN passes out of the stripping column along with the stripping gas and passes through line 325 back to the coke oven batteries where the gas is burned under the coke oven batteries as a gaseous fuel effectively destroying all of the HCN and forming harmless $N_2$ and $CO_2$. The practically HCN-free foul gas after absorption of the HCN is passed through the line 327 to the sulfur burner 169 associated with the Claus reactor 179. The gas passing to the sulfur burner will contain less than 0.1% HCN and will not harm the Claus apparatus. From this point on the operation and numbering of FIG. 5 is identical to FIG. 3 and a description of the FIGURE will not be repeated. For an explanation of the remainder of the operation of FIG. 5 reference should be had to the description of FIG. 3.

As an alternative to the water absorption system illustrated in FIG. 5 for the removal and disposal of HCN from the foul gas stream some other HCN destruction or removal system may be used such as an HCN hydrolysis reactor where the HCN is hydrolyzed by heating in the presence of water vapor, usually in the form of steam. Ammonia, water and $CO_2$ are formed in this reaction and the resulting gas can be processed in a Claus plant, where $NH_3$ may be made to burn harmlessly. A further alternative is the use of a socalled hydrogen cyanide destruct system such as disclosed in U.S. application Ser. No. 403,247 filed Oct. 3, 1973 by O. A. Homberg et al., now U.S. Pat. No. 3,923,957. The HCN conversion by this process produces, besides $NH_3$ and $CO_2$, some COS and $CS_2$. However, this does not further increase the COS and $CS_2$ content of the tail gas of the Claus process, since the COS and $CS_2$ contents are determined by the thermodynamic equilibrium in the catalytic gas phase reactors, irrespective of the COS and $CS_2$ contents of the foul gas.

In FIG. 6 there is shown a schematic simplified block diagram type flow sheet of the basic operation of the present invention including representations of typical gas compositions and gas quantities in moles per hour passing the various points. The gas compositions and quantities which are found at the various points designated by letters A through F in FIG. 6 are shown under these letter designations in Tables I, II, III and IV of FIGS. 6A, 6B, 6C and 6D respectively. The figures in the tables are calculated based upon actual experimental data. FIGS. 6A and 6B are illustrative of the treatment of a feed gas containing $H_2S$ but not containing HCN, in this example nautral gas. FIGS. 6C and 6D are representative of the treatment of a feed gas containing HCN, such as coke oven gas, with the operation being of a short duration in which the thiocyanate does not accumulate to a concentration sufficient to deteriorate the liquid phase reaction medium and affect the process. As previously stated, a feed gas containing $H_2S$ and HCN can be treated by the system depicted by the block diagram of FIG. 6 in a continuous operation if a portion of the liquid phase reaction medium is bled off and replaced by fresh reaction medium to prevent its degeneration by thiocyanate accumulation. Preferably such a feed gas is treated by the operation of the present invention shown in the block diagram type flow sheet of FIG. 7.

The basis taken in the tables is that 2,832,000 $Nm^3$ (=100 MM standard cubic feet) per day of gas enter the feed line 351 at point (A) with a composition as shown under (A) in Tables I and III (FIGS. 6a and 6C). A quantity of gas in kg-moles per hour which passes point (A) is shown under (A) in Tables II and IV (FIGS. 6B and 6D). The gas of composition (A) is treated to remove $H_2S$ selectively, i.e. so that $H_2S$ is removed substantially completely even though other components may not be removed completely, in the monoethanolamine absorber-desorber 353. All but 0.015 percent of the $H_2S$ is absorbed, thermally regenerated and passed into the foul gas line 355. This produces a desulfurized gas having a composition (C) which leaves the absorber-desorber 353 through line 357. The foul gas in line 355 has a composition (D). The foul gas then passes into a sulfur recovery system 359 comprised of a liquid-phase sulfur reactor in which $SO_2$, which is produced in a burner, not shown, by burning a portion of the sulfur product of the foul gas with about 0.5 moles of $O_2$ for every mol of $H_2S$, is reacted with the $H_2S$. The $SO_2$ produced is reacted in the liquid-phase reactor with the $H_2S$ to form elemental sulfur having a composition (F), which leaves in line 361, and a tail gas having a composition (E), which is recycled back in recycle line 363 to the feed gas line 351 giving a combined gas composition at point (B) just prior to the absorber-desorber 353 of composition (B).

In FIG. 7 there is shown a simplified schematic block diagram type flow sheet of the operation of the present invention to treat a feed gas containing $H_2S$ and HCN. Because of the insertion of an HCN removal system after the gas desulfurizer and before the sulfur recovery system, coke oven gas can be expediently processed. Tables V and VI in FIGS. 7A and 7B respectively pertain to an aqueous absorption/desorption HCN removal system and Tables VII and VIII in FIGS. 7C and 7D respectively pertain to an HCN destruct and removal system. The general description of FIG. 6 and its associated tables applies here as well and will not be repeated. Coke oven gas passes through the feed line 351 at point (A) and enters the MEA gas desulfurizer 353. Foul gas emerges via line 355 and enters the HCN removal system 365. Where the HCN removal system comprises an absorption and desorption step using water as the absorbing solution, the HCN is stripped from the water in a stripping column using a portion of the already desulfurized gas tapped from line 357 through broken line 367. The stripped HCN passes out of the HCN removal system along with the stripping gas and passes through broken line 369 back to the coke oven batteries to be utilized as a fuel. The practically HCN-free foul gas is then passed through line 371 to the sulfur recovery system which in this case can simply be a liquid phase reactor. The gas composition and quantities at various points throughout this embodiment having the aqueous absorption/desorption HCN removal system are shown in Tables V and VI of FIGS. 7A and 7B. Alternatively, where the HCN removal system is an HCN destruct system such as an HCN hydrolysis reactor or the HCN destruct system disclosed in U.S. application Ser. No. 403,247 filed Oct. 3, 1973 by O. A. Homberg et al., now U.S. Pat. No. 3,923,957, the foul gas containing $H_2S$ and HCN enters the reactor of the HCN removal system 365 via line 355 and exits as a gas containing $NH_3$ among its components in line 371. Because this resulting gas contains $NH_3$, it must be handled in a sulfur recovery system 359 comprising first a Claus reactor to burn the $NH_3$ to $N_2$ and $H_2O$ in addition to burning the $H_2S$ to $SO_2$ followed by a liquid phase sulfur reactor so that the $NH_3$ will not upset the pH of the liquid reaction medium. The tail gas from the sulfur recovery system is recycled back in recycle line 363 to feed line 351 prior to the MEA absorber-desorber 353. Lines 367 and 369 would not be needed for no stripping of absorbed HCN from a solution by a portion of the desulfurized gas stream is required in this particular HCN removal system. The gas compositions and quantities at the various points throughout the embodiment of FIG. 7 having an HCN destruct system of U.S. Pat. No. 3,923,957 are shown in Tables VII and VIII of FIGS. 7C and 7D.

By operation in accordance with the present invention a desulfurization process is provided which produces only a very minor amount of $H_2S$ contamination in the desulfurized gas and which has no tail gas of any description to dispose of. All of the sulfur which does not exit with the original desulfurized gas leaves the system in the form of elemental sulfur which can be used or sold profitably upon the commercial market. While some thiourea-type compounds may be formed in the desulfurizer portion of the system from the reaction of $CS_2$, the percentage of sulfur values so wasted is so small as to be completely negligible from an overall process viewpoint.

When the process of the invention is used in connection with the desulfurization of coke oven gas or the like it is particularly important that the recycled tail gas (a) be recycled into the system ahead of the desulfurizer (or absorption-desorption apparatus), (b) but after the primary coolers or after any step involving gas contact with an alkaline solution, and (c) that the tail gas contain essentially no $SO_2$.

First, if the recycle gas is added to the main coke oven gas stream ahead of the primary cooler some of the $H_2S$ will be reacted with ammonia in the coke oven gas to form $(NH_4)_2S$ or $NH_4HS$ which will be dissolved in the ammonia liquor. In the primary cooler this ammonia liquor partially absorbs oxygen which may have leaked through the coke oven doors or entered the coke oven during coal charging, or been added to the tail gas by burning sulfur with an excess of air. As a result of this oxygen absorption, the dissolved $HS^-$ ions are oxidized to thiosulfate ions $S_2O_3^{31}$. Once formed, the thiosulfate ions cannot be stripped in the ammonia liquor strippers and have ultimately to be disposed of, thus contributing to water pollution. Even more significantly such loss of thiosulfates contributes to a net loss of sulfur values in the process.

Second, if the recycle gas contains $SO_2$ in addition to $H_2S$, the $SO_2$ is immediately dissolved in the ammonia liquor forming sulfites, bisulfites and thiosulfates, and this further reduces the recovery of sulfur values in the process and increases possible water pollution problems.

Third, if the recycle gas containing $SO_2$ is added to the coke oven gas stream after the primary coolers, but ahead of the gas desulfurizers, the $SO_2$ will be immediately dissolved in the alkaline $H_2S$ absorbent forming thiosulfate which is nonregenerable. The desulfurizer solution will as a consequence be constantly contaminated with increasing quantitites of alkali thiosulfate. This contamination (a) represents a significant loss in sulfur values from the system, (b) increases the heat requirements of the desulfurizer stripper, and (c) must be regularly disposed of by bleeding at least part of the absorbed solution, thus creating a serious water pollution problem. If the desulfurizer absorbent is a monoethanolamine solution, the thiosulfate may be disposed of in the reclaimer as a solid waste.

In the present invention, on the other hand, the tail gas stream that is recycled to the coke oven gas stream after the primary coolers but ahead of the $H_2S$ absorber, does not contain any $SO_2$, thus the recycled $H_2S$ is totally absorbed in the $H_2S$ absorber without forming any thiosulfate. Consequently substantially all the sulfur values in the coke oven gas may be recovered as elemental sulfur, and none are degraded into thiosulfates, sulfides, sulfites and sulfates.

It is thus quite critical for the success of the process of the invention for a sufficient stoichiometric excess of $H_2S$ over $SO_2$ to be used in the sulfur reactor to assure that a complete reaction of all the $SO_2$ entering the system is effected. An excess of from 5% to 20% of $H_2S$ over the stoichiometric reaction ratio has been found to be satisfactory, but an excess of about 5% to 15% is preferred. Broadly any amount of $H_2S$ beyond a stoichiometric ratio of 2 may be satisfactory in a given system so long as the ratio is sufficiently great, or the excess is sufficiently large, to drive the reaction to a point where substantially no $SO_2$ leaves the sulfur reactor. It has also been found that since the high-temperature Claus reaction never completely uses up all the $SO_2$ present due to the unfavorable thermodynamic equilibrium conditions, at least with practical excesses of $H_2S$, that it is essential that at least the last stage of the sulfur removal step shall be accomplished in a liquid-phase type sulfur removal operation or other equivalent low temperature sulfur removal process. An excess of $H_2S$ in such a process will assure that substantially no $SO_2$ is present in the tail gas from the reactor and also that no new quantities of detrimental side-reaction compounds such as COS, and $CS_2$ will be formed.

It will be recognized from the foregoing detailed description of examples of the process of the invention that a very economical yet effective system for substantially complete elimination of sulfur pollution has been provided in the form of an effectively closed system from which as a practical matter no sulfur values can escape. The combination of the use of a low temperature sulfur removal step in a liquid phase reaction zone, which may be the primary zone or may be combined in series with a Claus or gas phase reaction zone, using an excess of $H_2S$ which is then recycled to an efficient alkanolamine or equivalently effective $H_2S$ absorption reaction which removes practically all the $H_2S$ content of the combined gas stream is both unique and particularly effective in preventing sulfur pollution and recovering all practical sulfur values. The arrangement of the invention is, furthermore, not only particularly effective, but is also relatively simple and may use only standard industrial equipment units which are readily available and economical to use.

We claim:

1. A method of substantially completely removing $H_2S$ and recovering the sulfur values as elemental sulfur from an industrial gas stream without exhaust into the environment of a tail gas, a bleed-off or a vent stream containing sulfur pollutants other than the desulfurized industrial gas comprising:
   (a) absorbing substantially all $H_2S$ from an $H_2S$ containing industrial gas in an absorption zone by contacting said gas stream with an alkanolamine absorbent solution in said absorption zone at a rate such that not more than 3 moles of $CO_2$ per mole of absorbed $H_2S$ is absorbed from the gas stream to form an $H_2S$-rich absorbent solution and a substantially desulfurized industrial gas,
   (b) stripping the $H_2S$-rich absorbent solution to recover the $H_2S$,
   (c) combining the recovered $H_2S$ with $SO_2$ in a ratio of $H_2S$ to $SO_2$ from 2.1:1 to 2.5-1 in a low temperature reaction zone operated at a temperature not greater than 160° C. within a liquid-phase reaction medium to form elemental sulfur and $H_2O$ with an excess of unreacted $H_2S$ remaining sufficient to ensure that there is essentially complete reaction of all $SO_2$ in said reaction zone with $H_2S$, (d) removing sulfur from the liquid phase reaction medium in the low temperature reaction zone in the form of elemental sulfur and excess unreacted $H_2S$ contained in a tail gas from said reaction zone, (e) recycling the tail gas containing the excess $H_2S$ from the liquid phase reaction medium in the low temperature reaction zone of step (c) to the absorption zone of step (a), and (f) passing the tail gas with the sulfur containing industrial gas through the absorption zone wherein $H_2S$ contained in the tail gas is absorbed into the alkanolamine absorbent solution while the remaining gases of the tail gas become part of the desulfurized industrial gas.

2. A method of removing $H_2S$ according to claim 1 wherein the tail gas is recycled into the $H_2S$-containing gas stream of step (a) prior to contact of said gas stream with the absorbent solution in the absorption zone of step (a).

3. A method of removing $H_2S$ from a gas stream according to claim 2 wherein the tail gas is recycled into the gas stream prior to contact of said gas stream with said absorbent solution in the absorption zone but subsequent to any prior gas processing step which would remove sulfur values from the gas stream.

4. A method of removing $H_2S$ from a gas stream according to claim 3 wherein the low temperature reaction zone is operated at a temperature not greater than 140° C.

5. A method of removing $H_2S$ from a gas stream according to claim 3 wherein the absorbing of $H_2S$ in step (a) is at a rate such that from 1.4 to 2 moles of $CO_2$ per mole of absorbed $H_2S$ is absorbed from the gas stream.

6. A method of removing $H_2S$ from a gas stream according to claim 1 wherein the ratio of $H_2S$ to $SO_2$ in step (c) is from 2.1:1 to 2.3:1.

7. A method of removing $H_2S$ from a gas stream according to claim 1 when the industrial gas stream also contains HCN wherein the $H_2S$ of step (b) is recovered as an $H_2S$-rich gas stream additionally comprising removing HCN from the $H_2S$-rich gas stream by an aqueous absorption/desorption HCN removal stage prior to reaction of said $H_2S$ with $SO_2$.

8. A method of removing $H_2S$ and recovering the sulfur values as elemental sulfur from an industrial gas stream without exhaust into the environment of a tail gas, a bleed-off or a vent stream containing sulfur pollutants other than the desulfurized industrial gas comprising:

(a) contacting an $H_2S$ containing industrial gas stream with an alkanolamine absorbing solution to absorb substantially all $H_2S$ from said gas stream at a rate such that not more than 3 moles of $CO_2$ per mole of absorbed $H_2S$ is absorbed and provide a substantially desulfurized industrial gas, (b) stripping the $H_2S$-rich absorbing solution of step (a) to recover $H_2S$, (c) reacting the $H_2S$ recovered in step (b) with $SO_2$ in at least two reaction stages comprising
  (i) a gas-phase reaction stage, and
  (ii) a final reaction stage operated at a temperature not greater then 160° C. within a liquid phase reaction medium, (d) said reaction stages having an operating $H_2S/SO_2$ ratio from 2.1:1 to 2.5:1 such that no $SO_2$ passes from the final liquid phase reaction stage of step (c)(ii), (e) removing sulfur from the reaction stages of step (c) in the form of elemental sulfur and from the final liquid phase reaction medium of step (c)(ii) as $H_2S$ contained in a tail gas, (f) recycling the tail gas from the final liquid phase reaction medium of step (c)(ii) into contact with the alkanolamine absorbing solution of step (a), and (g) passing the tail gas with the sulfur containing industrial gas through the absorption zone wherein $H_2S$ contained in the tail gas is absorbed into the alkanolamine absorbent solution while the remaining gases of the tail gas become part of the desulfurized industrial gas.

9. A method of removing $H_2S$ from a gas stream according to claim 8 wherein the tail gas from the final liquid phase reaction is recycled into the $H_2S$-containing gas stream of step (a) prior to contact of said gas stream with the absorbent solution of step (a).

10. A method of removing $H_2S$ from a gas stream according to claim 9 wherein the tail gas from the final reaction stage of step (c)(ii) is recycled into the $H_2S$-containing gas stream passing to the absorbing solution subsequent to contact with any gas treating stage which might remove any sulfur values from the gas stream.

11. A method of removing $H_2S$ from a gas stream according to claim 10 wherein the ratio of $H_2S$ to $SO_2$ in step (c) is from 2.1:1 to 2.3:1.

12. A method of removing $H_2S$ from a gas stream according to claim 10 wherein the final liquid-phase reaction stage of step (c)(ii) is operated at a temperature of not greater than 140° C.

13. A method of removing $H_2S$ from a gas stream according to claim 10 wherein the absorbing of $H_2S$ in step (a) is at a rate such that from 1.4 to 2 mols of $CO_2$ per mole of absorbed $H_2S$ is absorbed from the gas stream.

14. A method of removing $H_2S$ from a gas stream according to claim 11 when the industrial gas stream also contains HCN wherein the $H_2S$ of step (b) is recovered as an $H_2S$-rich gas stream additionally comprising removing HCN from the $H_2S$-rich gas stream prior to reaction of said $H_2S$ with $SO_2$.

15. A method of removing $H_2S$ from a gas stream according to claim 10 wherein the absorbing solution is a monoethanolamine solution.

* * * * *